United States Patent
Matsui et al.

(10) Patent No.: US 7,439,687 B2
(45) Date of Patent: Oct. 21, 2008

(54) DISCHARGE LAMP LIGHTING CIRCUIT

(75) Inventors: Kotaro Matsui, Shizuoka (JP);
Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/807,021

(22) Filed: May 25, 2007

(65) Prior Publication Data
US 2007/0273302 A1 Nov. 29, 2007

(30) Foreign Application Priority Data
May 29, 2006 (JP) ............ P.2006-148199

(51) Int. Cl.
*H05B 37/02* (2006.01)
(52) U.S. Cl. ............. 315/300; 315/308; 315/DIG. 7
(58) Field of Classification Search ............ 315/82, 315/209 R, 219, 224, 225, 226, 291, 299, 315/300, 307, 308, 360, DIG. 7
See application file for complete search history.

(56) References Cited
U.S. PATENT DOCUMENTS
6,850,015 B2 * 2/2005 Ishizuka et al. ............ 315/224
6,960,886 B2 * 11/2005 Ishizuka ............ 315/80
2006/0197467 A1 * 9/2006 Ohta et al. ............ 315/224

FOREIGN PATENT DOCUMENTS
JP 2003-338390 11/2003

* cited by examiner

*Primary Examiner*—Thuy Vinh Tran
(74) *Attorney, Agent, or Firm*—Fish & Richardson P.C.

(57) ABSTRACT

A discharge lamp lighting circuit 1 includes an electric power supply part and a control part. The control part generates a control signal (Sc) for controlling the magnitude of electric power based on a lamp voltage (VL) of a discharge lamp. The electric power supply part supplies the electric power based on the control signal (Sc) from the control part to the discharge lamp. The control part has a differential computation part for differentiating a lamp voltage corresponding signal (VS) with respect to time and generating a first differential signal $Sd_1$ ($=dVS/dt$), and an integral computation part for integrating a second differential signal ($Sd_2$) which monotonously increases and decreases as the first differential signal ($Sd_1$) increases and decreases with respect to time and generating a first integral signal ($Si_1$), and generates the control signal (Sc) so that the electric power decreases with an increase in the first integral signal ($Si_1$).

10 Claims, 14 Drawing Sheets

DISCHARGE LAMP LIGHTING CIRCUIT

TECHNICAL FIELD

The present disclosure relates to a discharge lamp lighting circuit.

BACKGROUND

A discharge lamp such as a metal halide lamp used in a vehicle headlight is lit in the following manner. A high-voltage pulse (e.g., several tens kV) for prompting a dielectric breakdown between electrodes is first applied, and a discharge arc is struck between the electrodes and the portion between the electrodes is brought into conduction. Next, relatively large electric power is supplied to increase light emission intensity quickly. Thereafter, a voltage (lamp voltage) between the electrodes of the discharge lamp increases as the light emission intensity by vaporization of metal sealed inside a tube increases, so that the supplied electric power gradually is decreased according to an increase in this lamp voltage. In this manner, the light emission intensity of the discharge lamp quickly converges to a predetermined intensity while preventing an overshoot.

At present, a trace of mercury is sealed in the discharge lamp such as the metal halide lamp. However, a (mercury-free) discharge lamp without containing mercury is being developed to prevent environmental contamination at the time of disposal. FIG. 14(a) is a graph showing a typical example of changes (from a start of lighting) in luminous flux (graph G10), lamp voltage (graph G11) and supply electric power (graph G12) in a conventional discharge lamp in which mercury is sealed. Also, FIG. 14(b) is a graph showing a typical example of changes (from a start of lighting) in luminous flux (graph G13), lamp voltage (graph G14) and supply electric power (graph G15) in a mercury-free discharge lamp.

In the conventional discharge lamp in which mercury is sealed, a lamp voltage immediately after starting lighting is about 27 V and gradually increases to about 85 V with an increase in light emission intensity as shown in FIG. 14(a). A lighting circuit decreases the supply electric power from about 70 W to about 35 W according to a change (amount of change 58 V) in this lamp voltage. On the other hand, in the mercury-free discharge lamp, a lamp voltage immediately after starting lighting is equal to that of the discharge lamp with mercury (about 27 V) and the lamp voltage increases to about 45 V with an increase in light emission intensity, but the amount of change (18 V) is smaller than that of the discharge lamp with mercury as shown in FIG. 14 (b). Also, a lamp voltage value immediately after starting lighting or the amount of change in the lamp voltage with an increase in light emission intensity has variations depending on secular change or individual difference. When the amount of change in the lamp voltage is small, an influence of the variations by secular change or individual difference becomes relatively great, so that it becomes difficult to speedily converge the light emission intensity while preventing an overshoot in a method for controlling the supply electric power according to the lamp voltage value.

To address the problem of electric power supply to the mercury-free discharge lamp as described above, a discharge lamp apparatus described, for example, in Japanese Patent Reference JP-A-2003-338390, is intended to reduce an influence on electric power control by variations in lamp voltage of individual discharge lamps by storing a lamp voltage (lamp initial voltage) immediately after a start of lighting and controlling supply electric power based on the amount of change in the lamp voltage from this lamp initial voltage.

However, the discharge lamp apparatus described in JP-A-2003-338390 can present the following problem. As described above, a high-voltage pulse for prompting a dielectric breakdown between electrodes is first applied in the case of lighting a discharge lamp. A lamp voltage immediately after a start of lighting is influenced by this high-voltage pulse and becomes unstable, so that in a method using the lamp voltage immediately after the start of lighting as a lamp initial voltage, a value of the stored lamp initial voltage varies every operation and the amount of change in the calculated lamp voltage also varies every operation. Therefore, in the discharge lamp apparatus described in JP-A-2003-338390, it is difficult to control the supply of electric power with good reproducibility.

SUMMARY

The invention has been implemented in view of the problem described above. In some implementations, the discharge lamp lighting circuit disclosed below is capable of controlling supply electric power with good reproducibility while suppressing an influence of variations in a voltage between electrodes by secular change or individual difference in a discharge lamp.

Among other things, in order to address the problem, a discharge lamp lighting circuit is disclosed to supply electric power for lighting a discharge lamp to the discharge lamp. The circuit comprises a control part for generating a control signal for controlling magnitude of the electric power based on a voltage between electrodes of the discharge lamp, and an electric power supply part for supplying the electric power based on the control signal from the control part to the discharge lamp. The control part has a differential computation part for differentiating a signal according to the voltage between electrodes with respect to time and generating a first differential signal and a first integral computation part for integrating a second differential signal which monotonously increases and decreases as the first differential signal increases and decreases with respect to time and generating a first integral signal, and generates the control signal so that the electric power decreases with an increase in the first integral signal.

The present inventors found that there is a strong correlation, which has an extremely small influence of change with time or individual difference in a discharge lamp, between change in light emission intensity and a differential value and an integral value of a voltage between electrodes even when the amount of change in the voltage between electrodes of the discharge lamp with an increase in the light emission intensity is small and there are variations in magnitude of the voltage between electrodes. In the discharge lamp lighting circuit described above, a control part differentiates a signal according to the voltage between electrodes with respect to time and generates a first differential signal, and integrates a second differential signal which monotonously increases and decreases as this first differential signal increases and decreases with respect to time and generates a first integral signal, and generates a control signal so that electric power decreases with an increase in this first integral signal. Consequently, supply of electric power can be controlled while suppressing an influence of variations in the voltage between electrodes by secular change or individual difference in the discharge lamp.

Also, in some implementations of the discharge lamp lighting circuit described above, the supply electric power is controlled based on the first integral signal in which the second differential signal is integrated, so that even when a voltage between electrodes immediately after a start of lighting is influenced by a high-voltage pulse and varies, an influence on electric power control can be reduced by action of averaging the variations. Therefore, the supply electric power can be controlled during each operation with good reproducibility.

In some implementations, the first integral computation part integrates the first differential signal with respect to time and further generates a second integral signal and the control part offers the control signal based on the first integral signal to the electric power supply part after the second integral signal reaches a first predetermined value. Consequently, the electric power control described above can be started under a certain condition that an integral value of the first differential signal reaches the first predetermined value, so that even when individual difference in a voltage between electrodes immediately after a start of lighting is large, an influence of the individual difference can be suppressed more effectively.

Also, the first integral computation part can include a first conversion part for converting the second differential signal into a second current signal, a second conversion part for converting the first differential signal into a first current signal, a first capacitive element for charging the first current signal and outputting a voltage across the first capacitive element as the second integral signal and also charging the second current signal and outputting a voltage across the first capacitive element as the first integral signal and a first current control part for controlling supply of the first and second current signals to the first capacitive element based on the voltage across the first capacitive element, and the first current control part controls the first and second current signals so that the first current signal is first supplied to the first capacitive element and the second current signal is supplied to the first capacitive element after the voltage across the first capacitive element reaches the first predetermined value or the corresponding value.

In some implementations, the first current signal is first supplied to the first capacitive element and thereby, integral computation of the first differential signal is performed and the second integral signal can be generated. Then, after the voltage across the first capacitive element (indicating the second integral signal in this case) reaches the first predetermined value or the corresponding value, the second current signal instead of the first current signal is supplied to the first capacitive element and thereby, integral computation of the second differential signal is performed and the first integral signal can be generated. Also, one capacitive element (first capacitive element) combines a capacitive element for integrating the first differential signal and generating the second integral signal with a capacitive element for integrating the second differential signal and generating the first integral signal, so that a circuit size can be reduced further.

Also, in some implementations, the control part has a second integral computation part for integrating the first differential signal with respect to time and generating a second integral signal, and offers the control signal based on the first integral signal to the electric power supply part after the second integral signal reaches a first predetermined value. Consequently, the electric power control described above can be started under a certain condition that an integral value of the first differential signal reaches the first predetermined value, so that even when individual difference in a voltage between electrodes immediately after a start of lighting is large, an influence of the individual difference can be suppressed more effectively.

Also, the first integral computation part can include a first conversion part for converting the second differential signal into a second current signal and a first capacitive element for charging the second current signal and outputting a voltage across the first capacitive element as the first integral signal, and the second integral computation part includes a second conversion part for converting the first differential signal into a first current signal and a second capacitive element for charging the first current signal and outputting a voltage across the second capacitive element as the second integral signal, and the control part further has a first current control part for controlling supply of the second current signal to the first capacitive element so that the second current signal is supplied to the first capacitive element after the voltage across the second capacitive element reaches the first predetermined value or the corresponding value.

The first differential signal can be integrated by the second capacitive element and the second integral signal can be generated. Then, after the voltage across the second capacitive element (that is, the second integral signal) reaches the first predetermined value or the corresponding value, the second current signal is controlled so as to supply the second current signal to the first capacitive element and thereby, integral computation of the second differential signal is performed and the first integral signal can be generated.

In some implementations, the first integral computation part has a resistance element connected between a constant-voltage source and the first capacitive element, and a second current control part for supplying a current from the constant-voltage source to the first capacitive element when a voltage across the first capacitive element is larger than a second predetermined value. In this discharge lamp lighting circuit, when the voltage across the first capacitive element (first integral signal) reaches the second predetermined value, a current from the constant-voltage source is superposed on the second current signal. That is, a signal which monotonously increases depending on only elapsed time is superposed on the first integral signal.

When some time has elapsed since a start of lighting, a change in a state of the inside of a tube of a discharge lamp becomes small, so that it is preferable to control the supply electric power based on the elapsed time rather than to control the supply electric power based on an integral value and a time differential value of a voltage between electrodes. According to this discharge lamp lighting circuit, the signal which monotonously increases depending on only the elapsed time is superposed on the first integral signal and thereby, the discharge lamp can be shifted to a steady state while the supply electric power is gradually converged on target electric power and light emission intensity close to target intensity is maintained. Further, start timing of electric power control based on the elapsed time is defined based on the first integral signal and thereby, a gradual change in light emission intensity in the case of shifting to the electric power control based on the elapsed time can be obtained.

In some implementations, the first current control part stops supply of the second current signal to the first capacitive element after a voltage across the first capacitive element reaches a third predetermined value larger than the second predetermined value, and the third predetermined value is less than or equal to a value of the voltage across the first capacitive element at a point in time when the first differential signal becomes maximum. A discharge lamp includes means which exhibits characteristics in which the first differential signal suddenly decreases after the first differential signal becomes maximum and means which does not exhibit the characteristics. In this discharge lamp lighting circuit, before the first differential signal becomes maximum, supply of the second current signal to the first capacitive element is stopped and subsequently, only a current from a constant-voltage source is integrated by the first capacitive element. Therefore, supply electric power is controlled based on only a signal which monotonously increases depending on only elapsed time, and an influence on a control signal by variations in the first differential signal after the first differential signal becomes maximum can be avoided.

The first integral computation part can include a function computation part for receiving the first differential signal and generating the second differential signal, and the function computation part converts the first differential signal into the second differential signal according to a function having a positive first slope when magnitude of the first differential signal is smaller than a fourth predetermined value, and converts the first differential signal into the second differential signal according to a function having a positive second slope smaller than the first slope when magnitude of the first differential signal is larger than the fourth predetermined value. According to this discharge lamp lighting circuit, even in a time region in which a voltage between electrodes suddenly increases by vaporization of metal of the inside of a tube (that is, the first differential signal increases), a sudden decrease in supply electric power can be prevented and a more speedup in convergence of light emission intensity can be achieved.

Various advantages can be obtained in some implementations. For example, the supply of electric power can be controlled with good reproducibility while suppressing an influence of variations in a voltage between electrodes by secular change or individual difference in a discharge lamp.

Other features and advantages will be apparent from the following detailed description, the accompanying drawings and the claims.

DETAILED DESCRIPTION

Preferred embodiments of a discharge lamp lighting circuit according to the invention are described below in detail with reference to the drawings. In addition, in the description of the drawings, the same numerals are assigned to the same or corresponding parts.

First Embodiment

Figure 1:
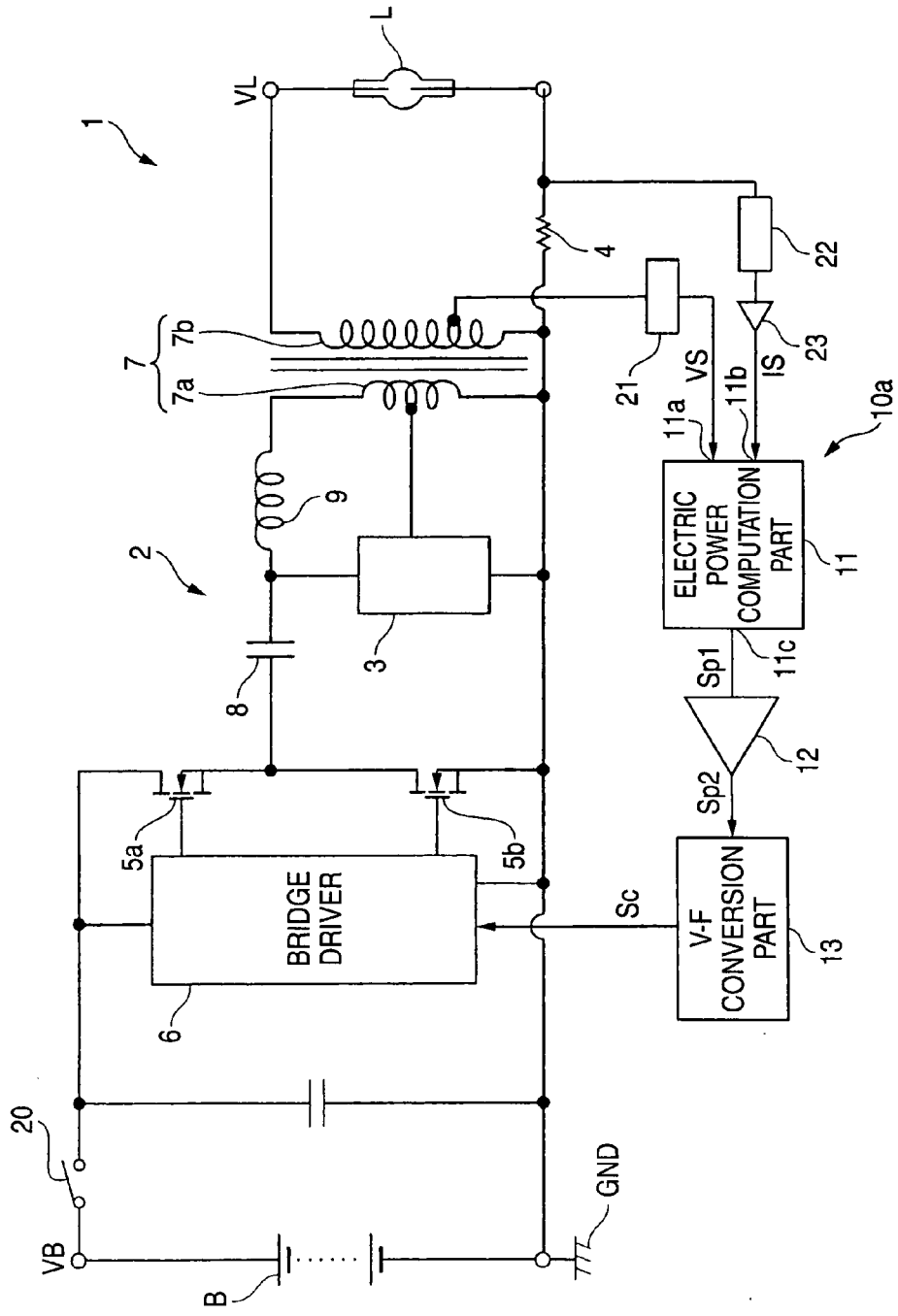
FIG. 1 is a block diagram showing a configuration of a first embodiment of a discharge lamp lighting circuit according to the invention.

FIG. 1 is a block diagram showing an example of a configuration of a first embodiment of a discharge lamp lighting circuit according to the invention. A discharge lamp lighting circuit 1 shown in FIG. 1 is a circuit for supplying electric power for lighting a discharge lamp L to the discharge lamp L, and a DC voltage from a DC power source B is converted into an AC voltage and is supplied to the discharge lamp L. The discharge lamp lighting circuit 1 is mainly used in lamp fittings such as, particularly, a headlight for a vehicle. In addition, as the discharge lamp L, for example, a mercury-free metal halide lamp is suitably used, but discharge lamps with other structures may be used.

The discharge lamp lighting circuit 1 comprises an electric power supply part 2 for receiving power source supply from the DC power source B and supplying AC electric power to the discharge lamp L, and a control part 10a for controlling magnitude of supply electric power to the discharge lamp L based on a voltage (hereinafter called a lamp voltage) between electrodes of the discharge lamp L.

The electric power supply part 2 supplies electric power of magnitude based on a control signal Sc from the control part 10a described below to the discharge lamp L. The electric power supply part 2 is connected to the DC power source B (e.g., a battery) through a switch 20 for lighting operation, and receives a DC voltage VB from the DC power source B and makes AC conversion and a step-up. The electric power supply part 2 of the present embodiment has a starting circuit 3 for applying a high-voltage pulse to the discharge lamp L at the time of a start of lighting, two transistors 5a and 5b, and a bridge driver 6 for driving the transistors 5a and 5b. As the transistors 5a and 5b, for example, an N-channel MOSFET can be used, but other FETs or bipolar transistors may be used. In the embodiment, a drain terminal of the transistor 5*a* is connected to a plus side terminal of the DC power source B and a source terminal of the transistor 5*a* is connected to a drain terminal of the transistor 5*b* and a gate terminal of the transistor 5*a* is connected to the bridge driver 6. Also, a source terminal of the transistor 5*b* is connected to a ground potential line GND (that is, a minus side terminal of the DC power source B) and a gate terminal of the transistor 5*b* is connected to the bridge driver 6. The bridge driver 6 alternately brings the transistors 5*a* and 5*b* into conduction.

The electric power supply part 2 of the embodiment further has a transformer 7, a capacitor 8 and an inductor 9. The transformer 7 is disposed in order to apply a high-voltage pulse to the discharge lamp L and transmit electric power and also step up the electric power. Also, a series resonance circuit is constructed of the transformer 7, the capacitor 8 and the inductor 9. That is, a primary winding 7*a* of the transformer 7, the inductor 9 and the capacitor 8 are mutually connected in series. Then, one end of its series circuit is connected to the source terminal of the transistor 5*a* and the drain terminal of the transistor 5*b* and the other end is connected to the ground potential line GND. In this configuration, a resonance frequency is determined by capacitance of the capacitor 8 and combined reactance made of inductance of the inductor 9 and leakage inductance of the primary winding 7*a* of the transformer 7. In addition, the series resonance circuit is constructed by only the primary winding 7*a* and the capacitor 8 and the inductor 9 may be omitted. Also, it may be constructed so that inductance of the primary winding 7*a* is set extremely smaller than that of the inductor 9 and a resonance frequency is substantially determined by capacitance of the capacitor 8 and inductance of the primary winding 7*a*.

In the electric power supply part 2, using a series resonance phenomenon by an inductive element (an inductance component or an inductor) and the capacitor 8, a drive frequency of the transistors 5*a* and 5*b* is defined at a value of this series resonance frequency or higher and the transistors 5*a* and 5*b* are alternately turned on and off and AC electric power is produced in the primary winding 7*a* of the transformer 7. This AC electric power is stepped up and transmitted to a secondary winding 7*b* of the transformer 7 and is supplied to the discharge lamp L connected to the secondary winding 7*b*. In addition, the bridge driver 6 for driving the transistors 5*a* and 5*b* drives each of the transistors 5*a* and 5*b* reciprocally so that both the transistors 5*a* and 5*b* do not become a connection state.

Figure 2:
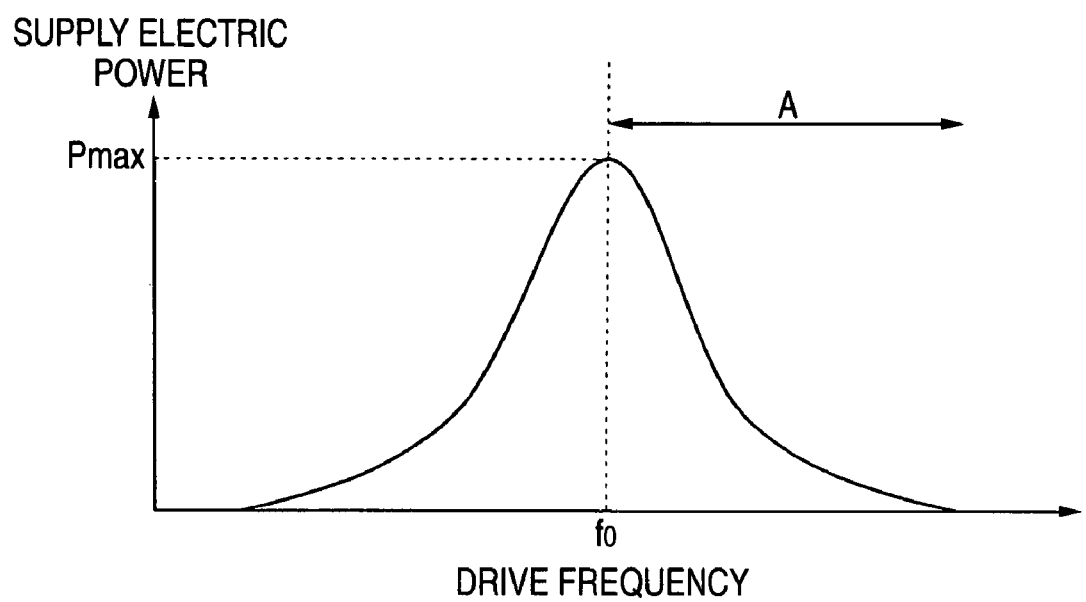
FIG. 2 is a graph conceptually showing a relation between magnitude of supply electric power and a drive frequency of a transistor.

Also, impedance of this series resonance circuit varies depending on the drive frequency of the transistors 5*a* and 5*b* by the bridge driver 6. Therefore, magnitude of AC electric power supplied to the discharge lamp L can be controlled by changing the drive frequency. Here, FIG. 2 is a graph conceptually showing a relation between magnitude of supply electric power and the drive frequency of the transistors 5*a* and 5*b*. As shown in FIG. 2, magnitude of electric power supplied to the discharge lamp L becomes a maximum value Pmax when the drive frequency is equal to a series resonance frequency fo, and decreases as the drive frequency becomes higher (or becomes lower) than the series resonance frequency fo. However, when the drive frequency is lower than the series resonance frequency fo, switching loss becomes large and electric power efficiency decreases. Therefore, magnitude of a drive frequency of the bridge driver 6 is controlled in a region (region A in FIG. 2) higher than the series resonance frequency fo. In the embodiment, the drive frequency of the bridge driver 6 is controlled according to a pulse frequency of the control signal Sc (signal including a frequency-modulated pulse train) from the control part 10*a* connected to the bridge driver 6.

The starting circuit 3 is a circuit for applying a high-voltage pulse for starting to the discharge lamp L, and when trigger voltage and current are applied from the starting circuit 3 to the transformer 7, the high-voltage pulse is superposed on an AC voltage generated in the secondary winding 7*b* of the transformer 7. In the starting circuit 3 of the embodiment, one of an output terminal is connected to the middle of the primary winding 7*a* of the transformer 7 and the other of the output terminal is connected to a ground potential side terminal of the primary winding 7*a*. An input voltage to the starting circuit 3 may be obtained from, for example, an auxiliary winding (not shown) for starting or the secondary winding 7*b* of the transformer 7 or maybe obtained from an auxiliary winding by disposing the auxiliary winding constructing the transformer together with the inductor 9.

The control part 10*a* controls magnitude of supply electric power to the discharge lamp L based on a lamp voltage of the discharge lamp L. The control part 10*a* of the embodiment has an electric power computation part 11 for computing magnitude of electric power to be supplied to the discharge lamp L, an error amplifier 12 for amplifying and outputting a difference between a predetermined reference voltage and an output voltage $Sp_1$ from the electric power computation part 11, and a V-F conversion part 13 for making voltage-frequency conversion (V-F conversion) of a signal $Sp_2$ which is an analog signal output from the error amplifier 12 and generating the control signal Sc.

The electric power computation part 11 has input ends 11*a* and 11*b* and an output end 11*c*. The input end 11*a* is connected to an intermediate tap of the secondary winding 7*b* through a peak hold circuit 21 in order to input a signal (hereinafter called a lamp voltage corresponding signal) VS indicating magnitude of a lamp voltage VL of the discharge lamp L. The lamp voltage corresponding signal VS is set at, for example, 0.35 time the peak value of the lamp voltage VL. The input end 11*b* is connected to one end of a resistance element 4 disposed for detecting a lamp current of the discharge lamp L through a peak hold circuit 22 and a buffer 23. One end of the resistance element 4 is further connected to one electrode of the discharge lamp L through an output terminal of the discharge lamp lighting circuit 1, and the other end of the resistance element 4 is connected to the, ground potential line GND. Then, a lamp current corresponding signal IS indicating magnitude of the lamp current is output from the buffer 23. Also, the output end 11*c* is connected to the error amplifier 12.

Figure 3:
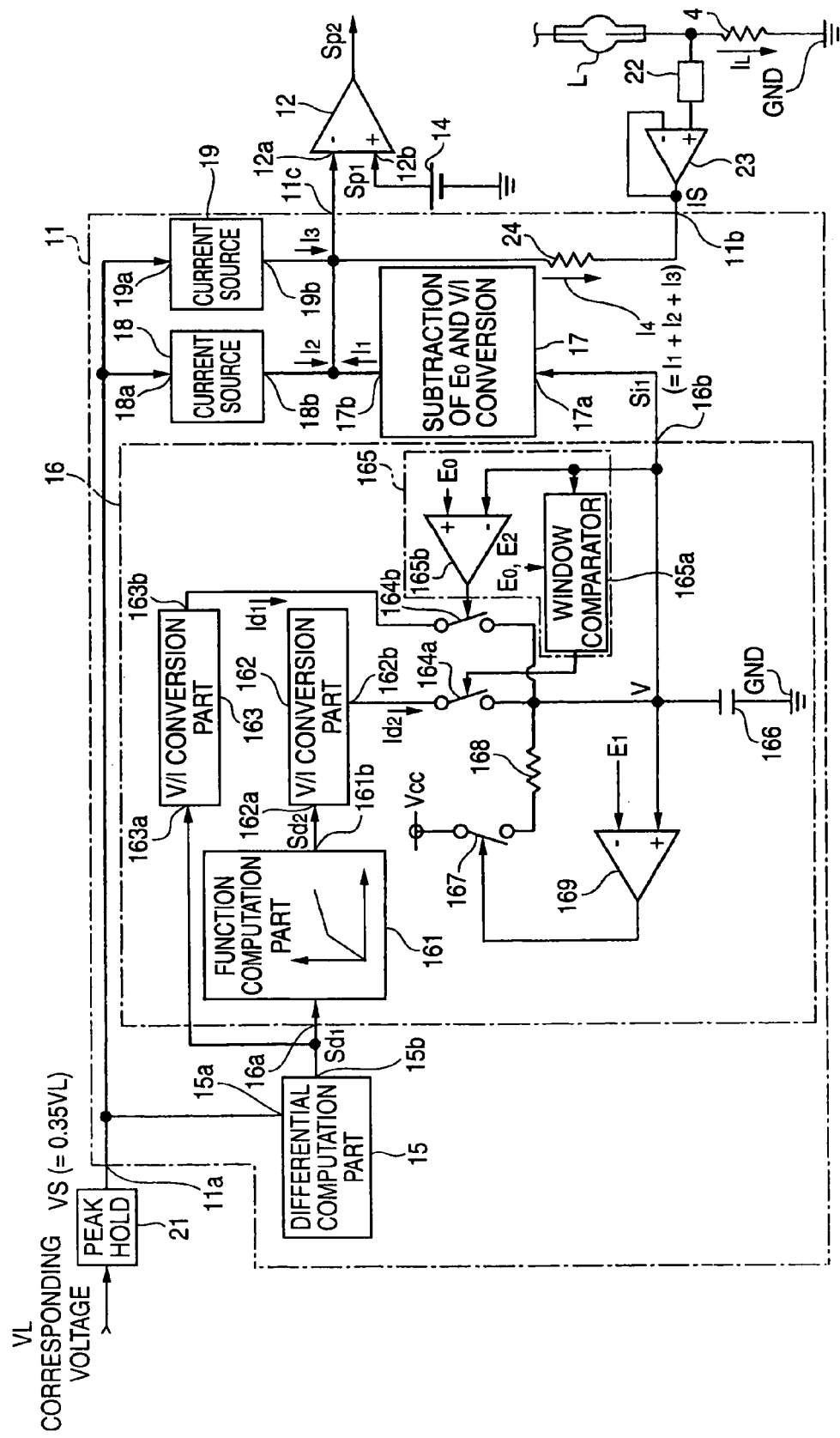
FIG. 3 is a block diagram showing a configuration of the inside and periphery of an electric power computation part of the first embodiment.

Here, FIG. 3 is a block diagram showing a configuration of the inside and periphery of the electric power computation part 11 of the embodiment. Referring to FIG. 3, the electric power computation part 11 has a differential computation part 15, an integral computation part (first integral computation part) 16, a V/I conversion part 17, and current sources 18 and 19.

The differential computation part 15 is a circuit part for computing a time differential value (dVS/dt) of the lamp voltage corresponding signal VS and generating a first differential signal $Sd_1$. An input end 15*a* of the differential computation part 15 is connected to the input end 11*a* of the electric power computation part 11. An output end 15*b* of the differential computation part 15 is connected to the integral computation part 16. In addition, such a differential computation part 15 is suitably constructed by, for example, a differentiation circuit using the lamp voltage corresponding signal VS as input.

The integral computation part 16 is a circuit part for integrating a second differential signal $Sd_2$ which monotonously increases and decreases as the first differential signal $Sd_1$ increases and decreases with respect to time and generating a first integral signal $Si_1$. An input end 16a of the integral computation part 16 is connected to the output end 15b of the differential computation part 15. An output end 16b of the integral computation part 16 is connected to the V/I conversion part 17.

The V/I conversion part 17 is a circuit part for subtracting a first predetermined value $E_0$ (described below) from the first integral signal $Si_1$ and also converting the subtracted value into a current signal $I_1$. An input end 17a of the V/I conversion part 17 is connected to the output end 16b of the integral computation part 16. An output end 17b of the V/I conversion part 17 is connected to the input end 11b of the electric power computation part 11 through a resistance element 24. In addition, such a V/I conversion part 17 is suitably constructed by, for example, a voltage-current converter and a differential amplifier using the first integral signal $Si_1$ and the predetermined value $E_0$ as input.

Figure 4:
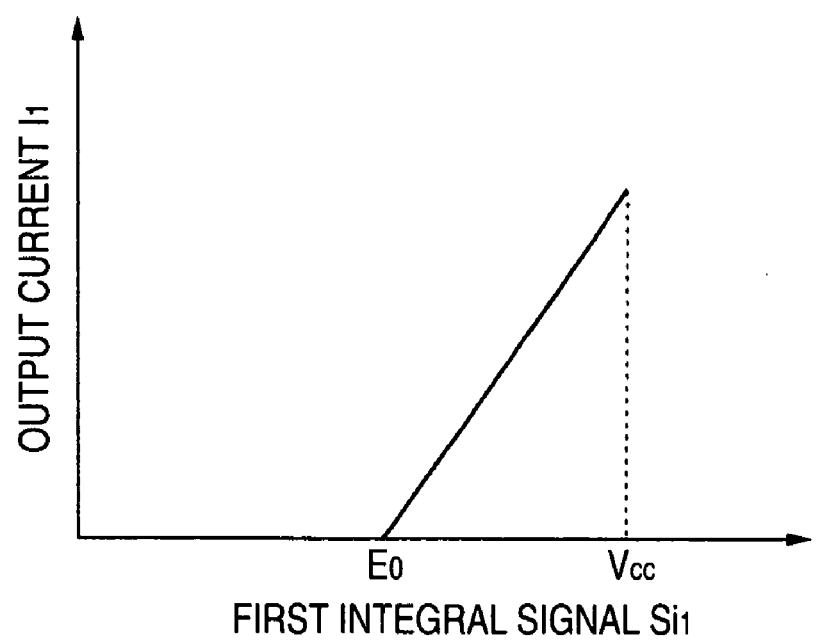
FIG. 4 is a graph showing a relation between an output current and a first integral signal inputted to a V/I conversion part of the first embodiment.

The V/I conversion part 17 outputs a current $I_1$ according to a function shown in, for example, FIG. 4. That is, the V/I conversion part 17 sets the current signal $I_1$ at zero when the first integral signal $Si_1$ is the first predetermined value $E_0$ or less, and outputs the current signal $I_1$ of the magnitude proportional to a value obtained by subtracting $E_0$ from the first integral signal $Si_1$ when the first integral signal $Si_1$ is the first predetermined value $E_0$ or more.

The current sources 18 and 19 are a circuit part for controlling steady electric power (for example, 35 [W]) and supply electric power (for example, 75 [W]) immediately after a start of lighting. Input ends 18a, 19a of the current sources 18, 19 are connected to the input end 11a of the electric power computation part 11. Output ends 18b, 19b of the current sources 18, 19 are connected to one input end 12a of the error amplifier 12 through the output end 11c of the electric power computation part 11. In addition, the other input end 12b of the error amplifier 12 is connected to a predetermined voltage source 14 for generating a predetermined reference voltage.

Figure 5:
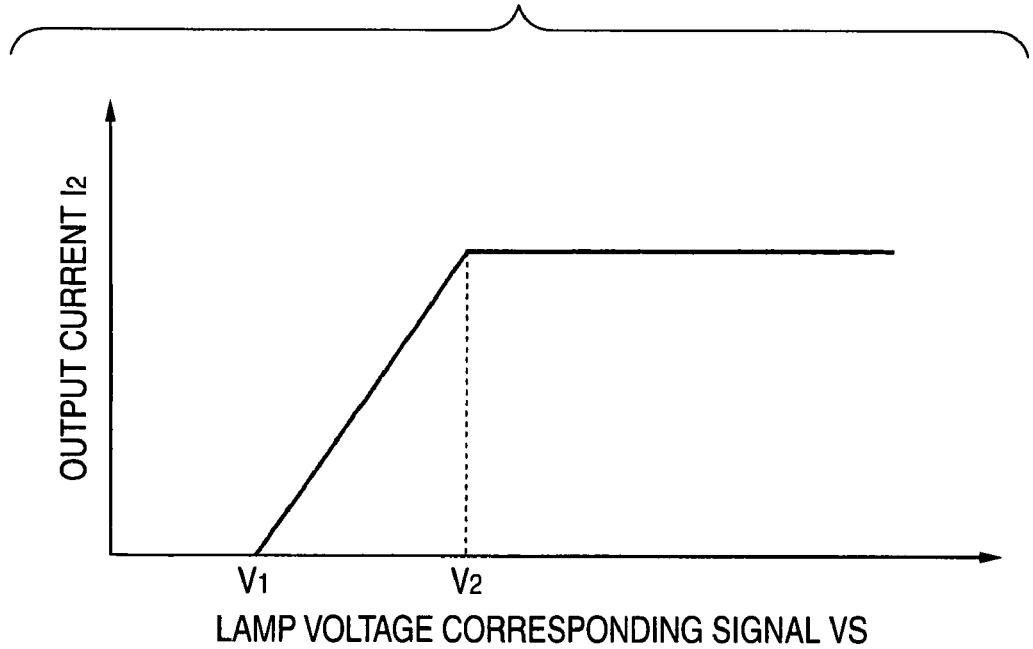
FIG. 5 illustrates diagrams showing relationships between lamp voltage and current output by a current source.
Figure 5:
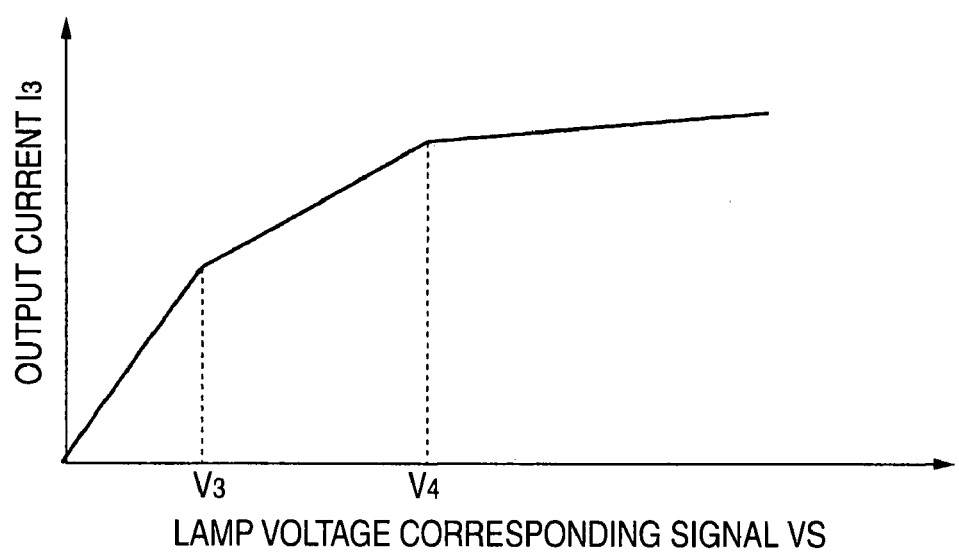

The current source 18 outputs a current $I_2$ according to a function shown, for example, in FIG. 5. That is, the current source 18 sets the current signal $I_2$ at zero when the lamp voltage corresponding signal VS is a certain predetermined value $V_1$ or less, and sets the current signal $I_2$ at a constant value when the lamp voltage corresponding signal VS is a certain predetermined value $V_2$ ($>V_1$) or more, and outputs the current signal $I_2$ of the magnitude proportional to the lamp voltage corresponding signal VS when the lamp voltage corresponding signal VS is $V_1$ or more and $V_2$ or less. The current source 19 outputs a current $I_3$ according to a function also shown, for example, in FIG. 5. That is, the current source 19 outputs the current signal $I_3$ of the magnitude proportional to the lamp voltage corresponding signal VS, and its proportional coefficient is set so as to become small as the lamp voltage corresponding signal VS becomes high.

The integral computation part 16 is now described in further detail. The integral computation part 16 of the embodiment includes a function computation part 161, V/I conversion parts 162 and 163, a current control part 165, and a capacitive element (first capacitive element) 166.

The function computation part 161 is a circuit part for generating the second differential signal $Sd_2$ which monotonously increases and decreases as the first differential signal $Sd_1$ increases and decreases. An input end 161a of the function computation part 161 is connected to the output end 15b of the differential computation part 15 through the input end 16a of the integral computation part 16. An output end 161b of the function computation part 161 is connected to the V/I conversion part 162.

The V/I conversion part 162 is a first conversion part in the embodiment, and converts the second differential signal $Sd_2$ which is a voltage signal into a second current signal $Id_2$. An input end 162a of the V/I conversion part 162 is connected to the output end 161b of the function computation part 161. An output end 162b of the V/I conversion part 162 is connected to one end of the capacitive element 166 through a switch 164a. The other end of the capacitive element 166 is connected to the ground potential line GND.

The V/I conversion part 163 is a second conversion part in the embodiment, and converts the first differential signal $Sd_1$ which is a voltage signal into a first current signal $Id_1$. An input end 163a of the V/I conversion part 163 is connected to the output end 15b of the differential computation part 15 through the input end 16a of the integral computation part 16. An output end 163b of the V/I conversion part 163 is connected to one end of the capacitive element 166 through a switch 164b.

The current control part 165 is a first current control part in the embodiment, and controls the first current signal $Id_1$ and the second current signal $Id_2$ based on a voltage V across the capacitive element 166. The current control part 165 is constructed by including, for example, a window comparator 165a and a comparator 165b. An input end of the window comparator 165a is connected to one end of the capacitive element 166 and an output end is connected to a control terminal of the switch 164a. The window comparator 165a outputs a voltage corresponding to logic 0 when an input voltage (that is, the voltage V across the capacitive element 166) is smaller than a predetermined value $E_0$ (first predetermined value) or the input voltage is larger than a predetermined value $E_2$ (third predetermined value), and outputs a voltage corresponding to logic 1 when the input voltage is larger than the predetermined value $E_0$ and is smaller than the predetermined value $E_2$. Also, an input end of the comparator 165b is connected to one end of the capacitive element 166 and an output end is connected to a control terminal of the switch 164b. The comparator 165b outputs a voltage corresponding to logic 1 when an input voltage (that is, the voltage V across the capacitive element 166) is smaller than the predetermined value $E_0$, and outputs a voltage corresponding to logic 0 when the input voltage is larger than the predetermined value $E_0$. In addition, the switches 164a and 164b shall become a connection state when the voltage corresponding to logic 1 is inputted to the control terminal, and become a non-connection state when the voltage corresponding to logic 0 is inputted to the control terminal.

In addition, the current control part 165 of the embodiment controls supply of the first current signal $Id_1$ and the second current signal $Id_2$ to the capacitive element 166 by the switches 164a and 164b, but the current control part 165 may control the second current signal $Id_2$ by directly controlling the function computation part 161 or the V/I conversion part 162 and also may control the first current signal $Id_1$ by directly controlling the V/I conversion part 163. Also, the current control part 165 of the embodiment includes the window comparator 165a in order to control the second current signal $Id_2$, but the second current signal $Id_2$ may be controlled using two comparators independent mutually. Also, the switches 164a and 164b described above are suitably implemented by a transistor such as an FET.

The integral computation part 16 further includes a switch 167, a resistance element 168 and a comparator 169 in addition to the above configuration. The switch 167 and the resistance element 168 are connected in series between a constant-voltage source Vcc and one end of the capacitive element 166. The switch 167 is suitably implemented by a transistor such as an FET. Also, the comparator 169 is a second current control part in the embodiment, and supplies a current from the constant-voltage source Vcc to the capacitive element 166 when the voltage V across the capacitive element 166 is larger than a predetermined value $E_1$ (second predetermined value). Concretely, an input end of the comparator 169 is connected to one end of the capacitive element 166 and an output end is connected to a control terminal of the switch 167. The comparator 169 outputs a voltage corresponding to logic 0 when an input voltage (that is, the voltage V across the capacitive element 166) is smaller than the predetermined value $E_1$, and outputs a voltage corresponding to logic 1 when the input voltage is larger than the predetermined value $E_1$. In addition, the switch 167 becomes a connection state when the voltage corresponding to logic 1 is inputted to the control terminal, and becomes a non-connection state when the voltage corresponding to logic 0 is inputted to the control terminal.

Figure 6:
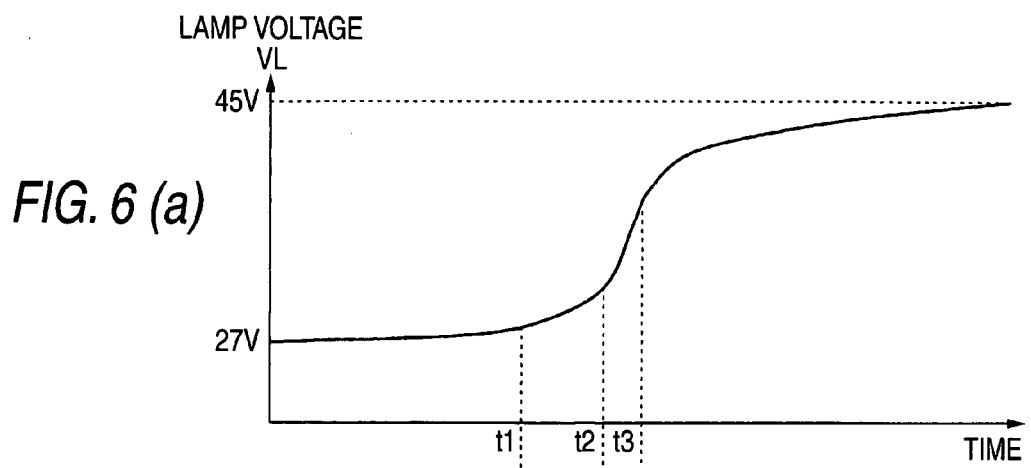
FIG. 6(a) is a graph showing a situation of a change in a lamp voltage with a lapse of time since immediately after a start of lighting.
FIG. 6(b) is a graph showing a situation of a change in a first differential signal with a lapse of time since immediately after a start of lighting.
FIG. 6(c) is a graph showing a situation of a change in a voltage across a capacitive element with a lapse of time since immediately after a start of lighting.
Figure 6:
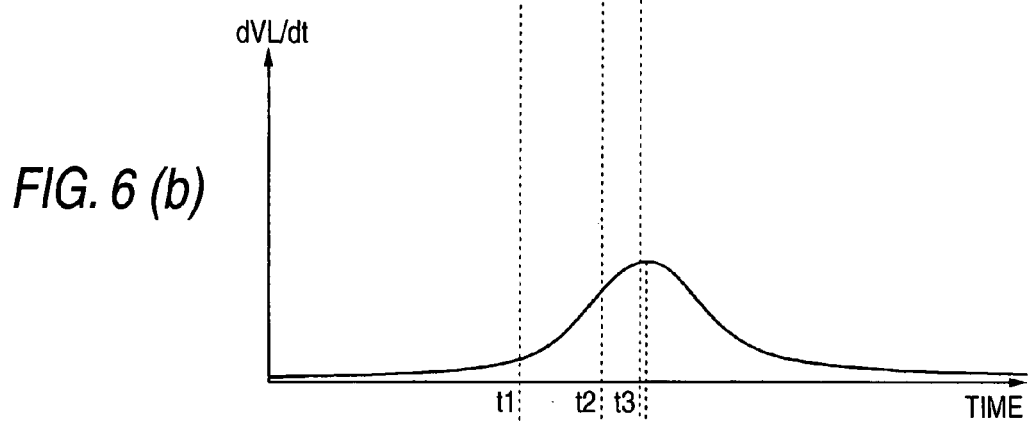
Figure 6:
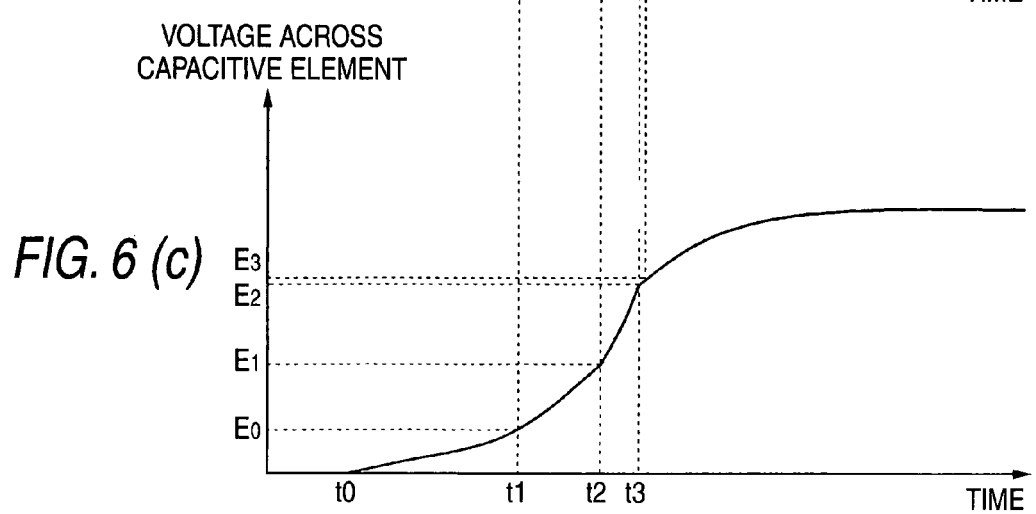
Figure 7:
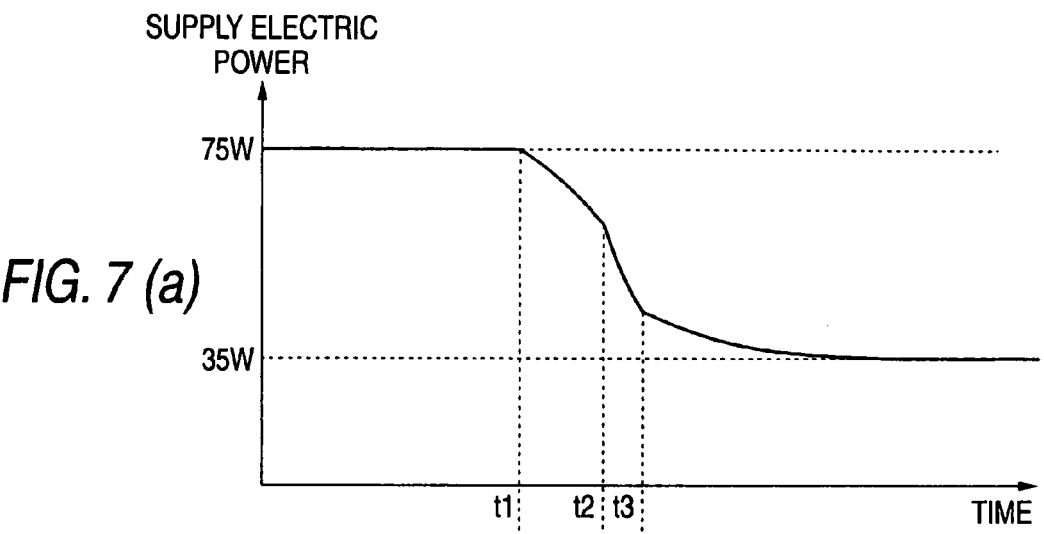
FIG. 7(a) is a graph showing a situation of a change in supply electric power to a discharge lamp with a lapse of time since immediately after a start of lighting.
FIG. 7(b) is a graph showing a situation of a change in light emission intensity of the discharge lamp with a lapse of time since immediately after a start of lighting.
Figure 7:
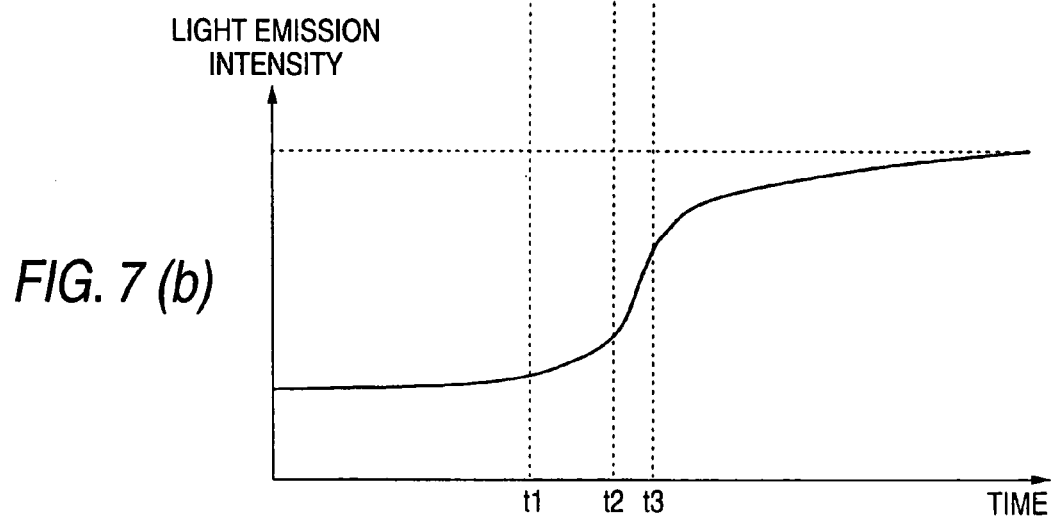

An operation of the discharge lamp lighting circuit 1 comprising the foregoing configuration is now described. FIGS. 6(a) to 6(c), respectively, show situations of changes in the lamp voltage VL (FIG. 6(a)), the first differential signal $Sd_1$ (=dVS/dt) (FIG. 6(b)) and the voltage V across the capacitive element 166 (FIG. 6(c)) with a lapse of time since immediately after a start of lighting. Also, FIGS. 7(a) and 7(b), respectively, show situations of changes in supply electric power (FIG. 7(a)) to the discharge lamp L and light emission intensity (FIG. 7(b)) of the discharge lamp L with a lapse of time since immediately after a start of lighting.

First, while the bridge driver 6 shown in FIG. 1 drives the transistors 5a and 5b at a predetermined drive frequency, a high-voltage pulse of several tens kV is applied between electrodes of the discharge lamp L and prompts a dielectric breakdown by the starting circuit 3. Immediately after that, the drive frequency of the bridge driver 6 is controlled to a drive frequency to which the predetermined maximum electric power (75 [W] the time of a cold start) is obtained according to a control signal Sc from the control part 10a. In the control part 10a, an output voltage $Sp_1$, to the error amplifier 12 is controlled by current signals $I_2$, $I_3$ output from the current sources 18, 19 (see FIG. 3) of the electric power computation part 11. Then, V-F conversion of an output voltage $SP_2$, which is a difference between this output voltage $Sp_1$, and a predetermined reference voltage, from the error amplifier 12 is made in the V-F conversion part 13 and the output voltage $SP_2$ is offered to the bridge driver 6 as the control signal Sc.

In addition, a voltage V across the capacitive element 166 of the integral computation part 16 becomes substantially a ground potential immediately after a start of lighting, so that the window comparator 165a of the current control part 165 controls the switch 164a in a non-connection state and the comparator 165b controls the switch 164b in a connection state. Also, the comparator 169 controls the switch 167 in a non-connection state.

Subsequently, when an output signal from the differential computation part 15 of the electric power computation part 11 becomes stable (time $t_0$ of FIG. 6(c)), a first differential signal $Sd_1$ (=dVS/dt) output from the differential computation part 15 is converted into a current signal $Id_1$ in the V/I conversion part 163 of the integral computation part 16 and is charged into the capacitive element 166 through the switch 164b. Consequently, the first differential signal $Sd_1$ is integrated with respect to time in the capacitive element 166. At this time, the voltage V across the capacitive element 166 is expressed by the following mathematical formula (1) and indicates magnitude of a second integral signal.

$$V = \int (dVS/dt)dt \qquad \text{[Mathematical formula 1]}$$

Subsequently, when the voltage V across the capacitive element 166 (a second integral signal in this case) reaches a predetermined value $E_0$ (time $t_1$ of FIGS. 6 and 7), the switch 164b is controlled in a non-connection state by the comparator 165b and supply of the first current signal $Id_1$ to the capacitive element 166 is stopped and at the same time, the switch 164a is controlled in a connection state by the window comparator 165a and supply of a second current signal $Id_2$ to the capacitive element 166 is started. That is, the first differential signal $Sd_1$ output from the differential computation part 15 is converted into a second differential signal $Sd_2$ by the function computation part 161 and the second differential signal $Sd_2$ is converted into the second current signal $Id_2$ in the V/I conversion part 162 and is charged into the capacitive element 166 through the switch 164a. Consequently, the second differential signal $Sd_2$ is integrated with respect to time in the capacitive element 166. At this time, the voltage V across the capacitive element 166 is expressed by the following mathematical formula (2) and indicates magnitude of a first integral signal $Si_1$. In addition, in the mathematical formula (2), f(x) represents a function computed in the function computation part 161.

$$V = \int f(dVS/dt)dt + E_0 \qquad \text{[Mathematical formula 2]}$$

Figure 8:
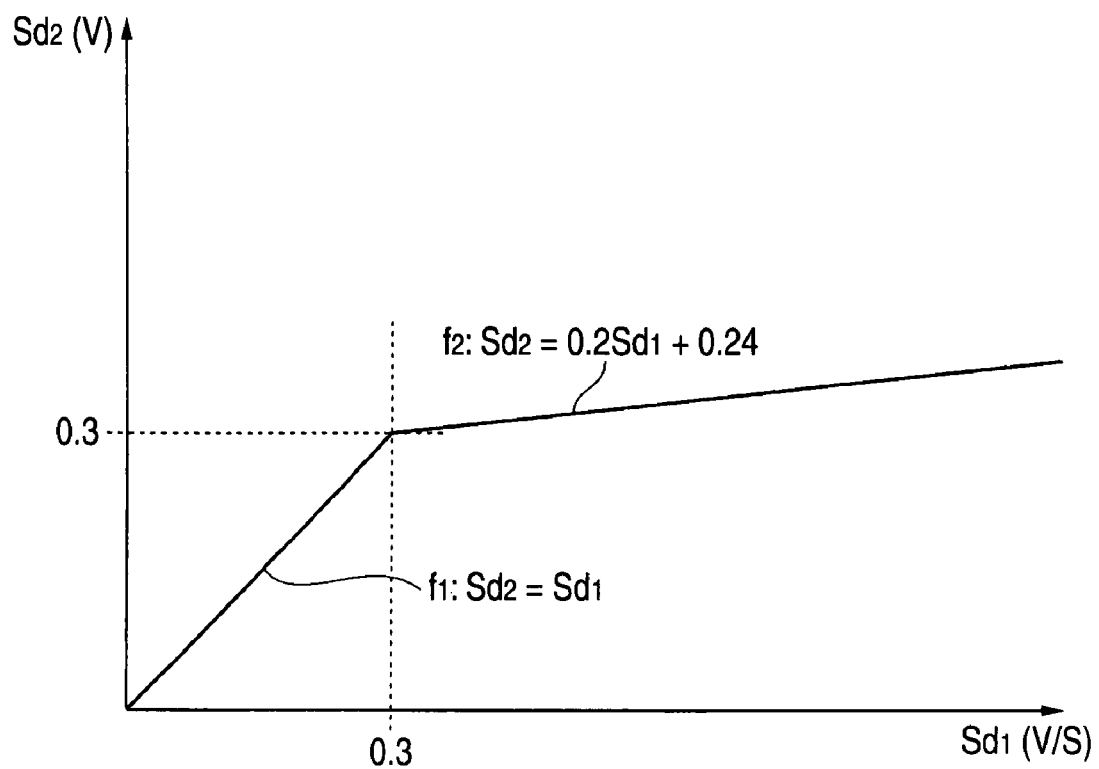
FIG. 8 is a graph showing one example of a function of a first differential signal and a second differential signal computed in a function computation part.

Here, FIG. 8 is a graph showing one example of the function f(x) of the first differential signal $Sd_1$ and the second differential signal $Sd_2$ computed in the function computation part 161 of the embodiment. As shown in FIG. 8, the function computation part 161 converts the first differential signal $Sd_1$ into the second differential signal $Sd_2$ according to a function $f_1$ having a positive certain slope (a first slope which is 1 in the example of FIG. 8) when magnitude of the first differential signal $Sd_1$ is smaller than a predetermined value (a fourth predetermined value which is 0.3 [V/s] in the example of FIG. 8), and converts the first differential signal $Sd_1$ into the second differential signal $Sd_2$ according to a function $f_2$ having a positive slope (a second slope which is 0.2 in the example of FIG. 8) smaller than the first slope when magnitude of the first differential signal $Sd_1$ is larger than the predetermined value. In addition, FIG. 8 shows a proportional function as one example of the functions $f_1$, $f_2$, but the functions $f_1$, $f_2$ may be a function whose slope varies according to the first differential signal $Sd_1$.

The voltage V across the capacitive element 166 is output from the integral computation part 16 as the first integral signal $Si_1$ and is inputted to the V/I conversion part 17. Then, the predetermined value $E_0$ (that is, the second term of the right side of the mathematical formula (2)) is subtracted from the first integral signal $Si_1$ and a voltage value after the subtraction is converted into a current signal $I_1$. In the electric power computation part 11 of the embodiment, a current signal $I_4$ formed by joining the current signal $I_1$ from the V/I conversion part 17 and the current signals $I_2$, $I_3$ from the current sources 18, 19 flows to an input end of the buffer 23 through the resistance element 24 as shown in FIG. 3. On the other hand, a lamp current $I_L$ flows in the resistance element 4, so that a voltage drop in this resistance element 4 occurs in an output end of the buffer 23 as a lamp current corresponding signal IS. That is, the output voltage $Sp_1$ from the electric power computation part 11 is determined by the current signal $I_4$ and the lamp current $I_L$. When the first integral signal $Si_1$ increases gradually (FIG. 6(c)), the current signal $I_1$ increases, so that a voltage drop in the resistance element 24 increases and a frequency of the control signal Sc output from the V-F conversion part 13 becomes high gradually. Consequently, supply electric power to the discharge lamp L is reduced gradually (FIG. 7(a)).

Subsequently, when the voltage V across the capacitive element 166 (first integral signal $Si_1$) reaches a predetermined value $E_1$ (time $t_2$ of FIGS. 6 and 7), the switch 167 is controlled in a connection state by the comparator 169. Consequently, a current from a constant-voltage source Vcc is superposed on the second current signal $Id_2$ and is integrated by the capacitive element 166 (FIG. 6(c)). That is, a signal (hereinafter called g(t)) which monotonously increases depending on only elapsed time is superposed on an integral value of the second differential signal $Sd_2$ and the voltage V across the capacitive element 166 becomes a value shown in the following mathematical formula (3). This voltage V across the capacitive element 166 is output as the first integral signal $Si_1$, and electric power according to this first integral signal $Si_1$ is reduced from the supply electric power to the discharge lamp L (FIG. 7(a)).

$$V = \int f(dVS/dt)dt + g(t) + E_0 \quad \text{[Mathematical formula 3]}$$

Subsequently, when the voltage V across the capacitive element 166 (first integral signal $Si_1$) reaches a predetermined value $E_2$ (>$E_1$) (time $t_3$ of FIGS. 6 and 7), the switch 164a is controlled in a non-connection state by the window comparator 165a and supply of the second current signal $Id_2$ to the capacitive element 166 is stopped. Consequently, only the current from the constant-voltage source Vcc is supplied to the capacitive element 166. That is, the supply electric power to the discharge lamp L is reduced according to only a time function g(t) and gradually converges on target electric power (for example, 35 [W]) (FIG. 7(a)). In addition, it is preferable that the predetermined value $E_2$ be less than or equal to the voltage V across the capacitive element 166 (a value $E_3$ shown in FIG. 6(c)) at a point in time when the first differential signal $Sd_1$ becomes maximum.

Effects obtained by the discharge lamp lighting circuit 1 of the embodiment described above are as follows. As described in the Background section, in a mercury-free discharge lamp, the amount of change in a lamp voltage since immediately after a start of lighting is as small as about 18 [V] and an influence of variations by secular change or individual difference becomes relatively large. The present inventors found that there is a strong correlation, which has an extremely small influence of change with time or individual difference, between change in light emission intensity and a differential value and an integral value of a lamp voltage even when the amount of change in the lamp voltage is small and there are variations in magnitude of the lamp voltage. In the discharge lamp lighting circuit 1 of the embodiment, the control part 10a differentiates the lamp voltage corresponding signal VS with respect to time and generates the first differential signal $Sd_1$, and integrates the second differential signal $Sd_2$ which monotonously increases and decreases as this first differential signal $Sd_1$ increases and decreases with respect to time and generates the first integral signal $Si_1$, and generates the control signal Sc so that a drive frequency becomes high (that is, supply electric power decreases) with an increase in this first integral signal $Si_1$. Consequently, the supply electric power can be controlled suitably while suppressing an influence of variations in the lamp voltage VL by secular change or individual difference in the discharge lamp L.

Also, the control part 10a of the embodiment controls the supply electric power based on the first integral signal $Si_1$ in which the second differential signal $Sd_2$ is integrated, so that even when the lamp voltage VL immediately after a start of lighting is influenced by a high-voltage pulse from the starting circuit 3 and varies, an influence on electric power control can be reduced by action of averaging the variations. Therefore, according to the discharge lamp lighting circuit 1 of the embodiment, the supply electric power can be controlled every operation with good reproducibility.

Also, as shown in the embodiment, the integral computation part 16 preferably integrates the first differential signal $Sd_1$ with respect to time and generates a second integral signal and the control part 10a offers the control signal Sc based on the first integral signal $Si_1$ to the electric power supply part 2 after the second integral signal reaches the predetermined value $E_0$. Consequently, electric power control based on the first integral signal $Si_1$ can be started under a certain condition that an integral value (second integral signal) of the first differential signal $Sd_1$ reaches the predetermined value $E_0$, so that even when individual difference in the lamp voltage VL immediately after a start of lighting is large, an influence of the individual difference can be suppressed more effectively.

Also, as shown in the embodiment, the integral computation part 16 is preferably constructed by including the V/I conversion parts 162 and 163, the current control part 165, and the capacitive element 166. Then, the current control part 165 preferably controls the first and second current signals $Id_1$ and $Id_2$ so that the first current signal $Id_1$ is first supplied to the capacitive element 166 and the second current signal $Id_2$ is supplied to the capacitive element 166 after the voltage V across the capacitive element 166 reaches the predetermined value $E_0$.

Thus, the first current signal $Id_1$ is first supplied to the capacitive element 166 and thereby, integral computation of the first differential signal $Sd_1$ is performed and the second integral signal can be generated suitably. Then, after the voltage V across the capacitive element 166 (second integral signal) reaches the predetermined value $E_0$, the second current signal $Id_2$ instead of the first current signal $Id_1$ is supplied to the capacitive element 166 and thereby, integral computation of the second differential signal $Sd_2$ is performed and the first integral signal $Si_1$ can be generated suitably. According to the integral computation part 16 thus, one capacitive element 166 combines a capacitive element for integrating the first differential signal $Sd_1$ and generating the second integral signal with a capacitive element for integrating the second differential signal $Sd_2$ and generating the first integral signal $Si_1$, so that a circuit size can be reduced further.

Also, as shown in the embodiment, the integral computation part 16 preferably has the resistance element 168 connected between the constant-voltage source Vcc and the capacitive element 166, and the second current control part (comparator 169) for supplying a current from the constant-voltage source Vcc to the capacitive element 166 when the voltage V across the capacitive element 166 (first integral signal $Si_1$) is larger than the predetermined value $E_1$. Then, when the voltage V across the capacitive element 166 (first integral signal $Si_1$) reaches the predetermined value $E_1$, the signal g(t) which monotonously increases depending on only elapsed time is preferably superposed on the first integral signal $Si_1$.

At an initial stage of a start of lighting, a change in a state of the inside of a tube of the discharge lamp L is great, so that supply electric power is controlled based on an integral value and a time differential value of the lamp voltage VL (an integral value and a time differential value (dVS/dt) of the lamp voltage corresponding signal VS in the embodiment) with a high correlation to light emission intensity and thereby, variations in the lamp voltage VL are accommodated and the supply electric power can be controlled suitably. However, when some time has elapsed since a start of lighting, the change in the state of the inside of the tube of the discharge lamp L becomes small, so that it is preferable to control the supply electric power based on elapsed time rather than to control the supply electric power based on the integral value and the time differential value of the lamp voltage VL. According to the discharge lamp lighting circuit 1 of the embodiment, the signal g(t) which monotonously increases depending on only the elapsed time is superposed on the first integral signal $Si_1$ and thereby, the discharge lamp L can be shifted to a steady state while the supply electric power is gradually converged on target electric power and light emission intensity close to target intensity is maintained. Further, start timing of electric power control based on the elapsed time is defined (predetermined value $E_1$) based on the first integral signal $Si_1$ and thereby, a gradual change in light emission intensity in the case of shifting to the electric power control based on the elapsed time can be obtained.

Also, when the integral computation part 16 has the resistance element 168 and the comparator 169, the current control part 165 preferably stops supply of the second current signal $Id_2$ to the capacitive element 166 after the voltage V across the capacitive element 166 reaches the predetermined value $E_2$ larger than the predetermined value $E_1$ as shown in the embodiment. Then, the predetermined value $E_2$ is preferably less than or equal to the voltage V across the capacitive element 166 (first integral signal $Si_1$) at a point in time when the first differential signal $Sd_1$ becomes maximum.

Figure 9:
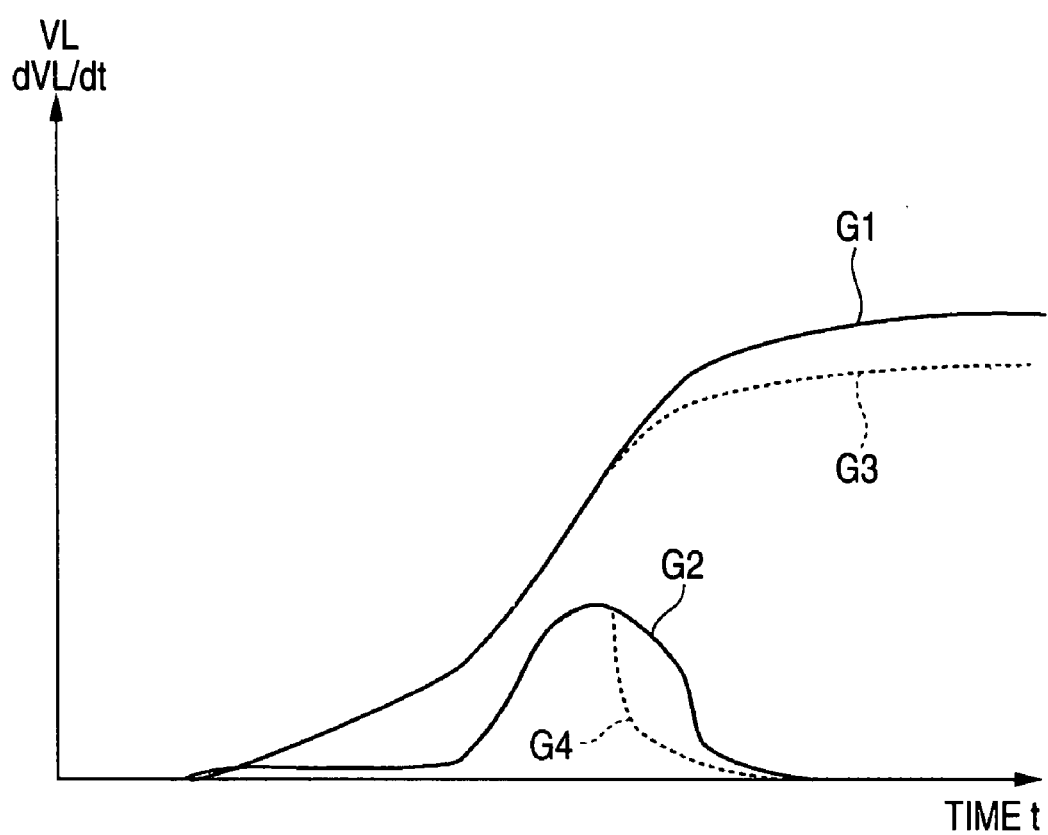
FIG. 9 is a graph conceptually showing a situation of a change in a lamp voltage and a change in its time differential value in two discharge lamps with different characteristics.

Here, FIG. 9 is a graph conceptually showing a situation of a change in the lamp voltage VL and a change in its time differential value (dVL/dt) in two discharge lamps with different characteristics. In addition, in FIG. 9, the axis of ordinate shows the lamp voltage VL or its time differential value and the axis of abscissa shows elapsed time since a start of lighting. Also, graphs G1 and G2 respectively show a lamp voltage VL of a certain discharge lamp and its time differential value, and graphs G3 and G4 respectively show a lamp voltage VL of another discharge lamp and its time differential value. As shown in the graphs, the discharge lamp includes means (graph G4) which exhibits characteristics in which a time differential value of the lamp voltage VL suddenly decreases after the time differential value becomes maximum, and means (graph G2) which exhibits characteristics in which the time differential value decreases relatively gradually. If electric power control based on the second differential signal $Sd_2$ is continued, light emission intensity of the discharge lamp having the characteristics as shown in graphs G3 and G4 may overshoot when the control part 10a is adjusted using the discharge lamp having the characteristics as shown in graphs G1 and G2. In reverse, when the control part 10a is adjusted using the discharge lamp having the characteristics as shown in graphs G3 and G4, light emission intensity of the discharge lamp having the characteristics as shown in graphs G1 and G2 may undershoot.

On the other hand, in the discharge lamp lighting circuit 1 of the embodiment, before the first differential signal $Sd_1$ becomes maximum, supply of the second current signal $Id_2$ to the capacitive element 166 is stopped and subsequently, only a current from the constant-voltage source Vcc is integrated by the capacitive element 166. Therefore, supply electric power is controlled based on only the signal g(t) which monotonously increases depending on only elapsed time, and an influence on the control signal Sc by variations in the first differential signal $Sd_1$ after the first differential signal $Sd_1$ becomes maximum can be avoided.

Figure 10:
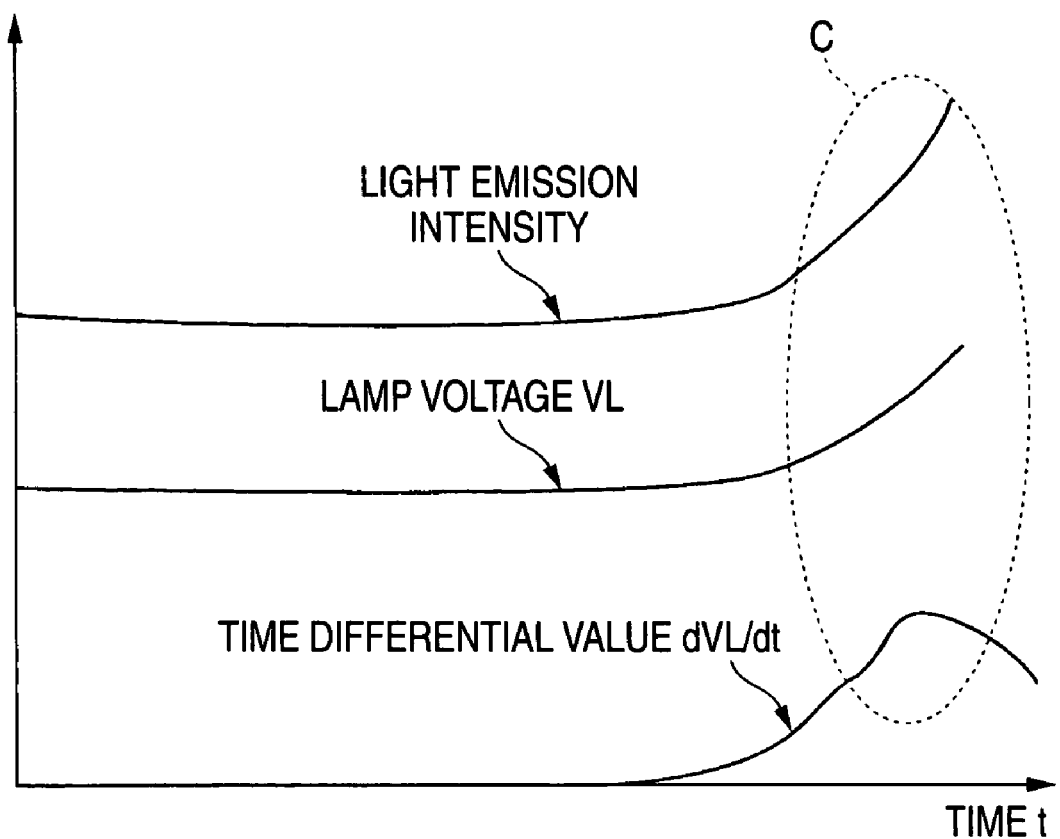
FIG. 10 is a graph showing one example of time changes in light emission intensity, a lamp voltage and a time differential value of the lamp voltage.

Also, as shown in FIG. 8, the function computation part 161 of the integral computation part 16 preferably converts the first differential signal $Sd_1$ into the second differential signal $Sd_2$ according to the function $f_1$ having a positive certain slope when magnitude of the first differential signal $Sd_1$ is smaller than a certain predetermined value, and converts the first differential signal $Sd_1$ into the second differential signal $Sd_2$ according to the function $f_2$ having a positive smaller slope when magnitude of the first differential signal $Sd_1$ is larger than the predetermined value. If supply electric power is controlled based on the first differential signal $Sd_1$ without making conversion by the function computation part 161, as shown in FIG. 10, in a time zone in which light emission intensity suddenly increases by vaporization of metal of the inside of a tube, that is, in the time zone (a region C in FIG. 10) in which the lamp voltage VL suddenly increases, the supply electric power is reduced more than necessary, with the result that a rise in light emission intensity is delayed. On the other hand, when the first differential signal $Sd_1$ (=dVS/dt) exceeds a certain predetermined value, the functions $f_1$, $f_2$ in which an increase in a current signal to the capacitive element 166 is suppressed are applied to the first differential signal $Sd_1$ and thereby, even in a time region in which the lamp voltage VL suddenly increases (that is, the first differential signal $Sd_1$ increases), the supply electric power can be prevented from being reduced more than necessary and a more speedup in convergence of light emission intensity can be achieved.

A concrete example of the function computation part 161 according to the first embodiment is now described. In addition, the following example is one example of a concrete circuit configuration for implementing the function computation part 161 according to the embodiment, and the function computation part 161 can also be implemented by circuit configurations other than the following circuit configuration.

Figure 11:
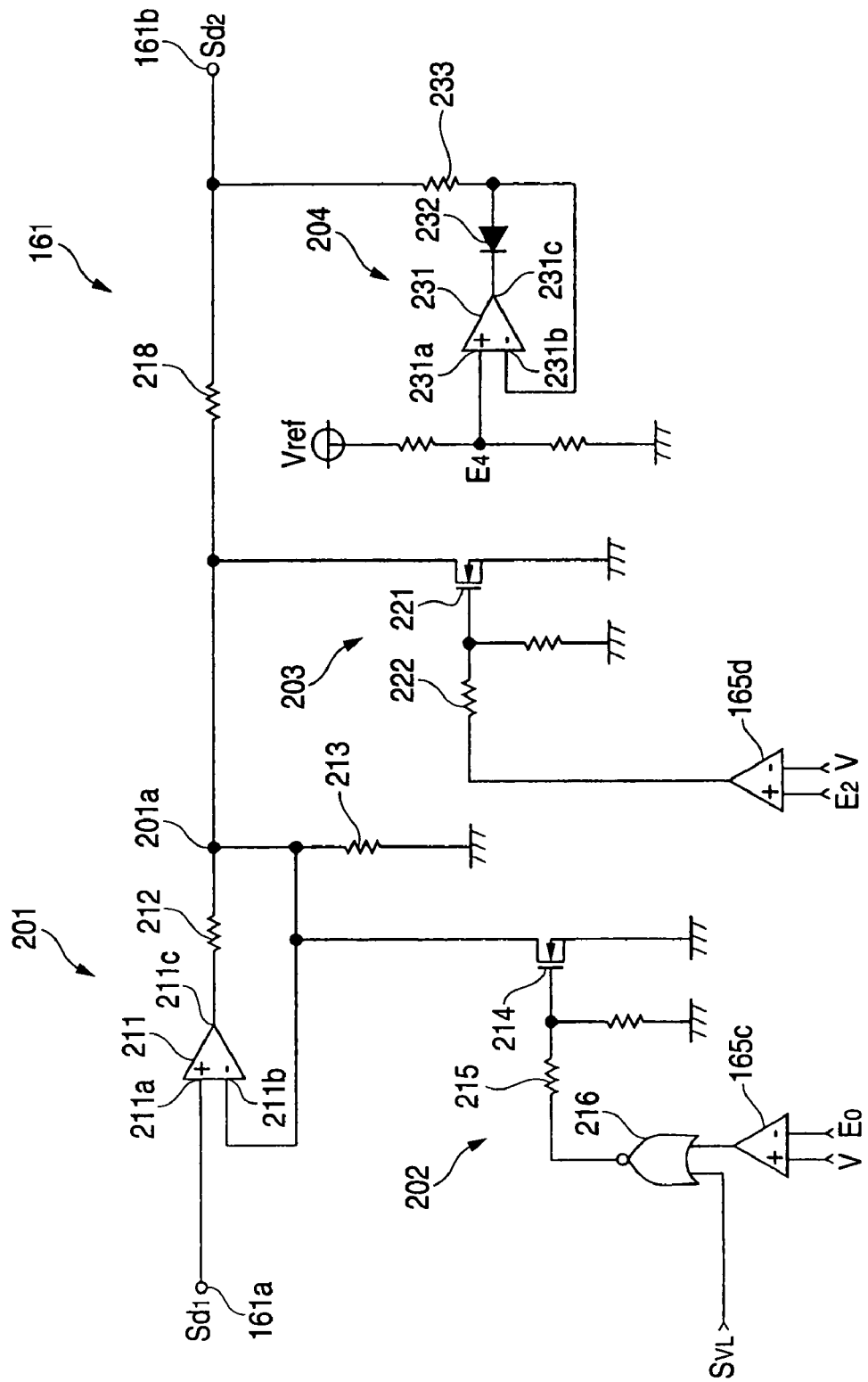
FIG. 11 is a circuit diagram showing a configuration example of the function computation part.

FIG. 11 is a circuit diagram showing a configuration example of the function computation part 161. Referring to FIG. 11, this function computation part 161 has an amplification circuit 201, output control circuits 202 and 203, and a suction buffer circuit 204. The amplification circuit 201 includes an amplifier 211. A non-inverting input end 211a of the amplifier 211 is connected to an input end 161a of the function computation part 161. An inverting input end 211b of the amplifier 211 is connected to an output end 211c of the amplifier 211 through a resistance element 212, and is grounded through a resistance element 213. Also, the inverting input end 211b is connected to an output end 201a of the amplification circuit 201.

The output control circuit 202 has a NOR circuit 216 and a transistor 214 such as an FET. A drain terminal of the transistor 214 is connected to the output end 201a of the amplification circuit 201. A source terminal of the transistor 214 is grounded and a gate terminal is connected to an output end of the NOR circuit 216 through a resistance element 215. One input end of the NOR circuit 216 is connected to an output end of a comparator 165c. In addition, the comparator 165c is one comparator in the case of dividing the window comparator 165a of the first embodiment into two independent comparators, and outputs a voltage corresponding to logic 1 when a voltage V across the capacitive element 166 (see FIG. 3) is larger than a predetermined value $E_0$. A signal $S_{VL}$ which becomes logic 1 when a lamp voltage VL exceeds a certain reference value is inputted to the other input end of the NOR circuit 216.

The output control circuit 203 has a transistor 221 such as an FET. A drain terminal of the transistor 221 is connected to the output end 201a of the amplification circuit 201. A source terminal of the transistor 221 is grounded and a gate terminal is connected to an output end of a comparator 165d through a resistance element 222. In addition, the comparator 165d is the other comparator in the case of dividing the window comparator 165a of the first embodiment into two independent comparators, and outputs a voltage corresponding to logic 1 when a voltage V across the capacitive element 166 (see FIG. 3) is larger than a predetermined value $E_2$.

The suction buffer circuit 204 has an amplifier 231 and a diode 232. A predetermined voltage $E_4$ (corresponding to a fourth predetermined value) in which resistance voltage division is made is inputted to a non-inverting input end 231a of the amplifier 231. An inverting input end 231b of the amplifier 231 is connected to an anode of the diode 232, and an output end 231c of the amplifier 231 is connected to a cathode of the diode 232. Also, the anode of the diode 232 is connected to the output end 201a of the amplification circuit 201 through a resistance element 233 and a resistance element 218. In addition, a point of connection between the resistance element 233 and the resistance element 218 is connected to an output end 161b of the function computation part 161.

When the voltage V across the capacitive element 166 exceeds the predetermined value $E_0$ (corresponding to time $t_1$ of FIG. 6(c)) in this function computation part 161, the transistor 214 becomes a non-connection state and a potential according to a first differential signal $Sd_1$ develops in the output end 201a of the amplification circuit 201. At this time, while the potential of the output end 201a of the amplification circuit 201 is the predetermined voltage $E_4$ or less, the amplifier 231 attempts to pass a current through the resistance elements 233 and 218, but the current is blocked by the diode 232. Therefore, a potential (second differential signal $Sd_2$) of the output end 161b becomes almost equal to the first differential signal $Sd_1$ (corresponding to the function $f_1$ shown in FIG. 8). Thereafter, when the potential of the output end 201a of the amplification circuit 201 exceeds the predetermined voltage $E_4$, the suction buffer circuit 204 sucks a current through the resistance elements 218 and 233, so that a value of the second differential signal $Sd_2$ becomes a value shown in the following mathematical formula (4) (corresponding to the function $f_2$ shown in FIG. 8).

$$Sd_2 = E_4 + (Sd_1 - E_4) \cdot R_{233} / (R_{233} + R_{218})$$
$$= Sd_1 \cdot R_{233} / (R_{233} + R_{218}) + E_4 \cdot R_{218} / (R_{233} + R_{218})$$

[Mathematical formula 4]

In addition, in the mathematical formula (4), $R_{218}$ and $R_{233}$ respectively represent resistance values of the resistance elements 218 and 233. Thereafter, when the voltage V across the capacitive element 166 exceeds the predetermined value $E_2$, the transistor 221 becomes a connection state and the output end 201a of the amplification circuit 201 is grounded and a signal output from the output end 161b is stopped.

Second Embodiment

Figure 12:
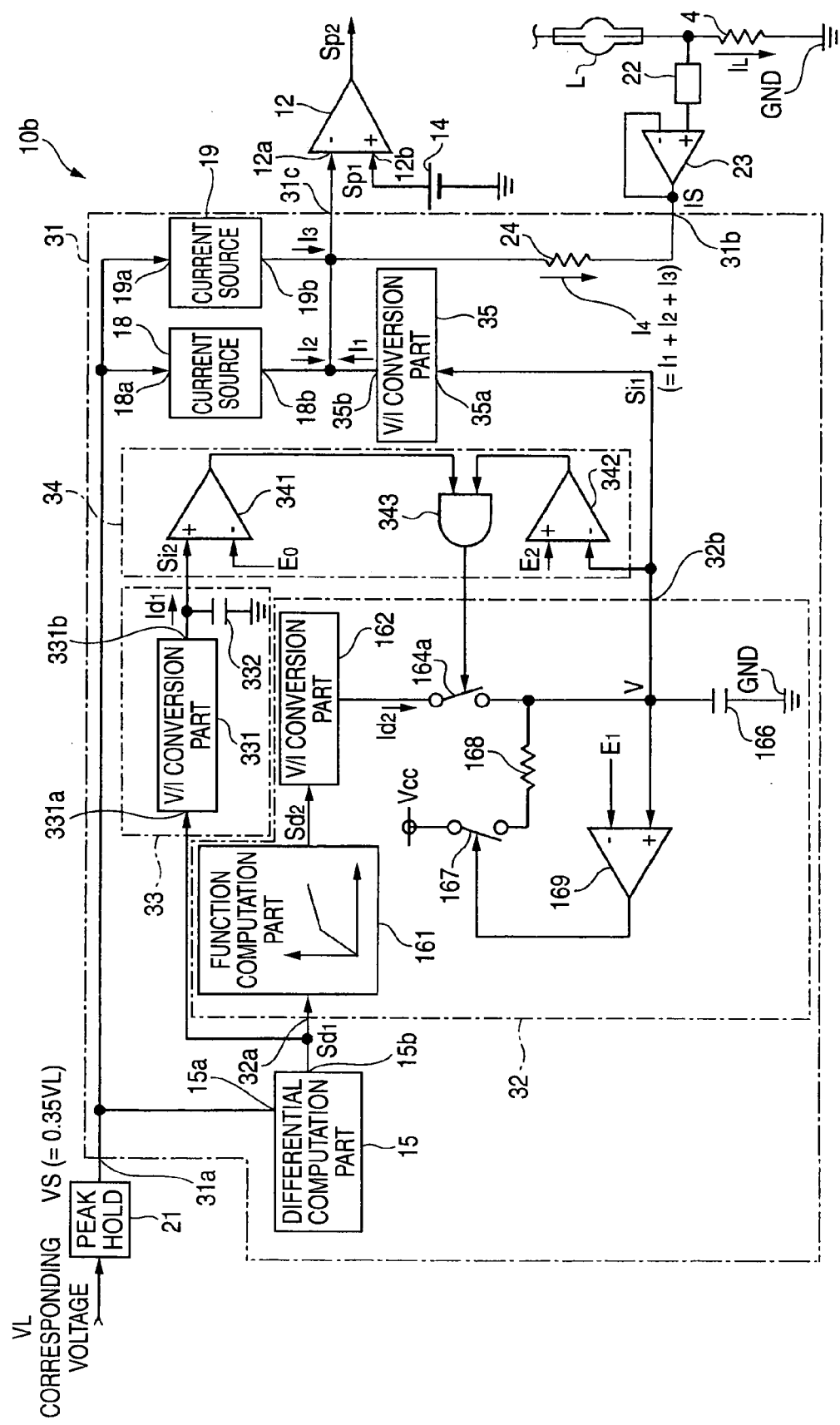
FIG. 12 is a block diagram showing a configuration of a control part of a second embodiment.

Next, another example of a control part will be described as a second embodiment of a discharge lamp lighting circuit according to the invention. FIG. 12 is a block diagram showing a configuration of a control part 10b of the present embodiment. The control part 10b of the embodiment has an electric power computation part 31 instead of the electric power computation part 11 of the first embodiment. The electric power computation part 31 has input ends 31a and 31b and an output end 31c. The input end 31a is connected to an intermediate tap of a secondary winding 7b (see FIG. 1) through a peak hold circuit 21. The input end 31b is connected to one end of a resistance element 4 (see FIG. 1) disposed for detecting a lamp current IS of a discharge lamp L through a peak hold circuit 22 and a buffer 23. The output end 31c is connected to an input end 12a of an error amplifier 12.

The electric power computation part 31 has a differential computation part 15, a first integral computation part 32, a second integral computation part 33, a current control part 34, a V/I conversion part 35, and current sources 18 and 19. The differential computation part 15 and the current sources 18 and 19 among them are similar to those of the first embodiment, so that detailed description is omitted.

The first integral computation part 32 is a circuit part for integrating a second differential signal $Sd_2$ based on a first differential signal $Sd_1$ inputted from the differential computation part 15 with respect to time and generating a first integral signal $Si_1$. An input end 32a of the integral computation part 32 is connected to an output end 15b of the differential computation part 15. An output end 32b of the integral computation part 32 is connected to the V/I conversion part 35.

The first integral computation part 32 includes a function computation part 161, a V/I conversion part 162 (first conversion part), a switch 164a, a capacitive element (first capacitive element) 166, a switch 167, a resistance element 168, and a comparator 169 (second current control part). These configurations are similar to those of the first embodiment.

The second integral computation part 33 is a circuit part for integrating a first differential signal $Sd_1$ with respect to time and generating a second integral signal $Si_2$. The second integral computation part 33 includes a V/I conversion part 331 (second conversion part) for converting the first differential signal $Sd_1$ which is a voltage signal into a first current signal $Id_1$, and a capacitive element 332 (second capacitive element) for charging the first current signal $Id_1$. An input end 331a of the V/I conversion part 331 is connected to the output end 15b of the differential computation part 15. An output end 331b of the V/I conversion part 331 is connected to one end of the capacitive element 332. In addition, the other end of the capacitive element 332 is grounded.

The current control part 34 is a first current control part in the embodiment, and controls supply of a second current signal $Id_2$ to the capacitive element 166 based on a voltage V across the capacitive element 166 (first integral signal $Si_1$) and a voltage across the capacitive element 332 (second integral signal $Si_2$). The current control part 34 is constructed by including, for example, comparators 341 and 342 and an AND circuit 343. An input end of the comparator 341 is connected to one end of the capacitive element 332 of the second integral computation part 33 and an output end is connected to one input end of the AND circuit 343. The comparator 341 outputs a voltage corresponding to logic 0 when an input voltage (that is, the voltage across the capacitive element 332) is smaller than a predetermined value $E_0$ (first predetermined value), and outputs a voltage corresponding to logic 1 when the input voltage is larger than the predetermined value $E_0$. Also, an input end of the comparator 342 is connected to one end of the capacitive element 166 and an output end is connected to the other input end of the AND circuit 343. The comparator 342 outputs a voltage corresponding to logic 1 when an input voltage (that is, the voltage V across the capacitive element 166) is smaller than a predetermined value $E_2$, and outputs a voltage corresponding to logic 0 when the input voltage is larger than the predetermined value $E_0$. In addition, an output end of the AND circuit 343 is connected to a control terminal of the switch 164a. The switch 164a becomes a connection state when the voltage corresponding to logic 1 is inputted to the control terminal, and becomes a non-connection state when the voltage corresponding to logic 0 is inputted to the control terminal.

In addition, the current control part 34 of the embodiment controls supply of the second current signal $Id_2$ to the capacitive element 166 by the switch 164a, but the current control part 34 may control the second current signal $Id_2$ by directly controlling the function computation part 161 or the V/I conversion part 162.

Figure 13:
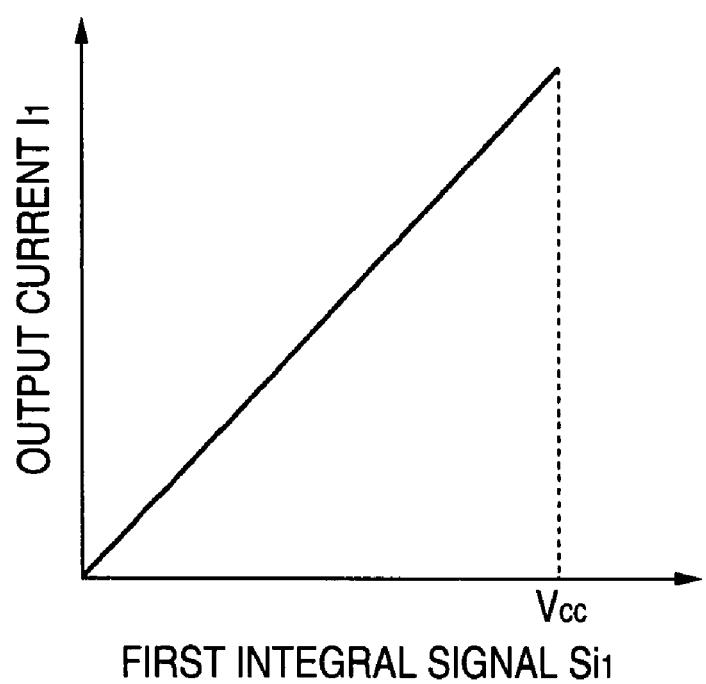
FIG. 13 is a graph showing a relation between an output current and a first integral signal inputted to a V/I conversion part of the second embodiment.
Figure 14:
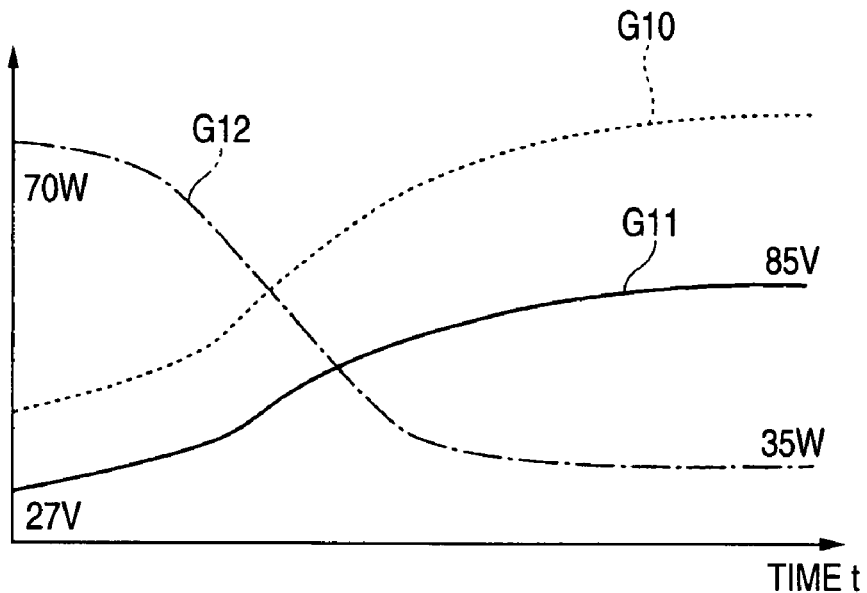
FIG. 14(a) is a graph showing a typical example of changes (from a start of lighting) in luminous flux (graph G10), lamp voltage (graph G11) and supply electric power (graph G12) in a conventional discharge lamp in which mercury is sealed.
FIG. 14(b) is a graph showing a typical example of changes (from a start of lighting) in luminous flux (graph G13), lamp voltage (graph G14) and supply electric power (graph G15) in a mercury-free discharge lamp.
Figure 14:
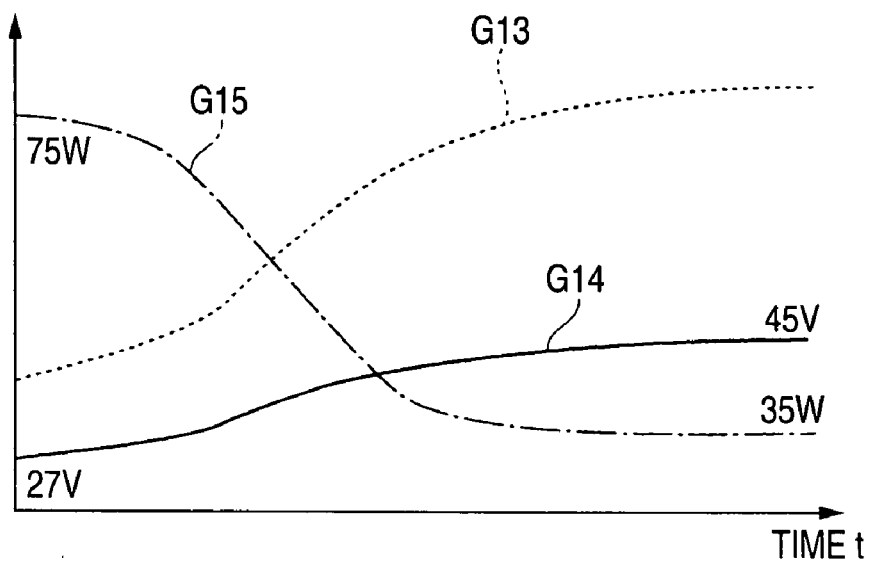

The V/I conversion part 35 is a circuit part for converting the first integral signal $Si_1$ into a current signal $I_1$. An input end 35a of the V/I conversion part 35 is connected to the output end 32b of the first integral computation part 32. An output end 35b of the V/I conversion part 35 is connected to the input end 31b of the electric power computation part 31 through a resistance element 24. The V/I conversion part 35 outputs the current $I_1$ according to, for example, a function shown in FIG. 13. That is, the V/I conversion part 35 outputs the current signal $I_1$ of magnitude proportional to the first integral signal $Si_1$.

An operation of the electric power computation part 31 comprising the above configuration will be described again with reference to FIGS. 6 and 7. When an output signal from the differential computation part 15 becomes stable after a start of lighting (time to of FIG. 6(c)), a first differential signal $Sd_1$ (=dVS/dt) output from the differential computation part 15 is converted into a current signal $Id_1$ in the V/I conversion part 331 of the second integral computation part 33 and is charged into the capacitive element 332. Consequently, the first differential signal $Sd_1$ is integrated with respect to time in the capacitive element 332 and a second integral signal $Si_2$ is generated.

Subsequently, when a voltage across the capacitive element 332 (that is, the second integral signal $Si_2$) reaches a predetermined value $E_0$ (time $t_1$ of FIGS. 6 and 7), an output of the comparator 341 becomes logic 1 and the switch 164a is controlled in a connection state and supply of a second current signal $Id_2$ to the capacitive element 166 is started. That is, the first differential signal $Sd_1$ output from the differential computation part 15 is converted into a second differential signal $Sd_2$ by the function computation part 161 and the second differential signal $Sd_2$ is converted into a second current signal $Id_2$ in the V/I conversion part 162 and is charged into the capacitive element 166 through the switch 164a. Consequently, the second differential signal $Sd_2$ is integrated with respect to time in the capacitive element 166 and a first integral signal $Si_1$ is generated.

The first integral signal $Si_1$ is output from the first integral computation part 32 and is inputted to the V/I conversion part 35. Then, the first integral signal $Si_1$ is converted into the current signal $I_1$ in the V/I conversion part 35. When the first integral signal $Si_1$ increases gradually (FIG. 6(c)), the current signal $I_1$ increases, so that a voltage drop in the resistance element 24 increases and a frequency of a control signal Sc output from the V-F conversion part 13 (see FIG. 1) becomes high gradually. Consequently, supply electric power to the discharge lamp L is reduced gradually (FIG. 7(a)).

Subsequently, when a voltage V across the capacitive element 166 (first integral signal $Si_1$) reaches a predetermined value $E_1$ (time $t_2$ of FIGS. 6 and 7), the switch 167 is controlled in a connection state by the comparator 169. Consequently, a current from a constant-voltage source Vcc is superposed on the second current signal $Id_2$ and the voltage V across the capacitive element 166 becomes a value in which a time function g(t) is superposed on an integral value of the second differential signal $Sd_2$. This voltage V across the capacitive element 166 is output as the first integral signal $Si_1$, and electric power according to this first integral signal $Si_1$ is reduced from the supply electric power to the discharge lamp L (FIG. 7(a)).

Subsequently, when the voltage V across the capacitive element 166 (first integral signal $Si_1$) reaches a predetermined value $E_2$ ($>E_1$) (time $t_3$ of FIGS. 6 and 7), an output of the comparator 342 becomes logic 0 and the switch 164a is controlled in a non-connection state and supply of the second current signal $Id_2$ to the capacitive element 166 is stopped. Consequently, only the current from the constant-voltage source Vcc is supplied to the capacitive element 166, and the supply electric power to the discharge lamp L is reduced according to only the time function g(t) and gradually converges on target electric power (for example, 35 [W]) (FIG. 7(a)).

Effects that can be obtained by some implementations of the discharge lamp lighting circuit (control part 10b) of the embodiment described above are as follows. The supply electric power can be controlled while suppressing an influence of variations in the lamp voltage VL by secular change or individual difference in the discharge lamp L in a manner similar to the first embodiment. Also, even when the lamp voltage VL immediately after a start of lighting is influenced by a high-voltage pulse from the starting circuit 3 and varies, an influence on electric power control can be reduced by action of averaging the variations and the supply electric power can be controlled every operation with good reproducibility.

Also, as shown in the embodiment, the control part 10b may have the second integral computation part 33 for integrating the first differential signal $Sd_1$ with respect to time and generating the second integral signal $Si_2$, and may offer the control signal Sc based on the first integral signal $Si_1$ to the electric power supply part 2 (see FIG. 1) after the second integral signal $Si_2$ reaches the predetermined value $E_0$. Consequently, electric power control based on the first integral signal $Si_1$ can be started under a certain condition that an integral value (second integral signal $Si_2$) of the first differential signal $Sd_1$ reaches the predetermined value $E_0$, so that even when individual difference in the lamp voltage VL immediately after a start of lighting is large, an influence of the individual difference can be suppressed more effectively.

Also, as shown in the embodiment, the first integral computation part 32 may include the V/I conversion part 162 and the capacitive element 166, and the second integral computation part 33 may include the V/I conversion part 331 and the capacitive element 332, and the current control part 34 may control the second current signal $Id_2$ so that the second current signal $Id_2$ is supplied to the capacitive element 166 after the voltage across the capacitive element 332 (that is, the second integral signal $Si_2$) reaches the predetermined value $E_0$.

By this configuration, the first differential signal $Sd_1$ is integrated by the capacitive element 332 and the second integral signal $Si_2$ can be generated. Then, the second current signal $Id_2$ is controlled so that the second current signal $Id_2$ is supplied to the capacitive element 166 after the voltage across the capacitive element 332 (that is, the second integral signal $Si_2$) reaches the predetermined value $E_0$ and thereby, integral computation of the second differential signal $Sd_2$ is performed and the first integral signal $Si_1$ can be generated.

The discharge lamp lighting circuit according to the invention is not limited to the specific embodiments described above, and various modifications can be made. For example, in the each of the embodiments described above, the control part (particularly, the electric power computation part) has been constructed by an analog circuit, but the control part (particularly, the electric power computation part) according to the invention may be implemented by executing predetermined software in a computer having a CPU and memory.

Other implementations are within the scope of the claims.

What is claimed is:

1. A discharge lamp lighting circuit for supplying electric power to light a discharge lamp, the discharge lamp lighting circuit comprising:
    control circuitry to generate a control signal for controlling a magnitude of the electric power based on a voltage between electrodes of the discharge lamp, and
    electric power supply circuitry to supply the electric power to the discharge lamp based on the control signal from the control circuitry,
    wherein the control circuitry comprises:
        differential computation circuitry to differentiate a signal according to the voltage between the electrodes with respect to time, and to generate a first differential signal, and
        first integral computation circuitry to integrate a second differential signal which monotonously increases and decreases as the first differential signal increases and decreases with respect to time, and to generate a first integral signal,
    wherein the control circuitry is operable to generate the control signal so that the electric power decreases with an increase in the first integral signal.

2. A discharge lamp lighting circuit as claimed in claim 1, wherein the first integral computation circuitry is operable to integrate the first differential signal with respect to time and to generate a second integral signal, and the control circuitry is operable to provide the control signal to the electric power supply circuitry based on the first integral signal after the second integral signal reaches a first predetermined value.

3. A discharge lamp lighting circuit as claimed in claim 2, wherein the first integral computation circuitry includes first conversion circuitry to convert the second differential signal into a second current signal, second conversion circuitry to convert the first differential signal into a first current signal, a first capacitive element to charge the first current signal and output a voltage across the first capacitive element as the second integral signal and to charge the second current signal and output a voltage across the first capacitive element as the first integral signal, and first current control circuitry to control supply of the first and second current signals to the first capacitive element based on the voltage across the first capacitive element, wherein the first current control circuitry is operable to control the first and second current signals so that the first current signal is first supplied to the first capacitive element and the second current signal is supplied to the first capacitive element after the voltage across the first capacitive element reaches the first predetermined value or the corresponding value.

4. A discharge lamp lighting circuit as claimed in claim 3, wherein the first integral computation circuitry includes:
    a resistance element connected between a constant-voltage source and the first capacitive element, and
    second current control circuitry to supply a current from the constant-voltage source to the first capacitive element when a voltage across the first capacitive element is larger than a second predetermined value.

5. A discharge lamp lighting circuit as claimed in claim 4, wherein the first current control circuitry is operable to stop supply of the second current signal to the first capacitive element after a voltage across the first capacitive element reaches a third predetermined value larger than the second predetermined value, and the third predetermined value is less than or equal to a value of the voltage across the first capacitive element when the first differential signal reaches its maximum value.

6. A discharge lamp lighting circuit as claimed in claim 1, wherein the control circuitry further has second integral computation circuitry to integrate the first differential signal with respect to time and to generate a second integral signal, and to provide the control signal to the electric power supply circuitry based on the first integral signal after the second integral signal reaches a first predetermined value.

7. A discharge lamp lighting circuit as claimed in claim 6, wherein the first integral computation circuitry includes first conversion circuitry to convert the second differential signal into a second current signal and a first capacitive element to charge the second current signal and output a voltage across the first capacitive element as the first integral signal, and wherein the second integral computation circuitry includes second conversion circuitry to convert the first differential signal into a first current signal and a second capacitive element to charge the first current signal and output a voltage across the second capacitive element as the second integral signal, and wherein the control circuitry further has first current control circuitry to control supply of the second current signal to the first capacitive element so that the second current signal is supplied to the first capacitive element after the voltage across the second capacitive element reaches the first predetermined value or the corresponding value.

8. A discharge lamp lighting circuit as claimed in claim 7, wherein the first integral computation circuitry includes:
    a resistance element connected between a constant-voltage source and the first capacitive element, and
    second current control circuitry to supply a current from the constant-voltage source to the first capacitive element when a voltage across the first capacitive element is larger than a second predetermined value.

9. A discharge lamp lighting circuit as claimed in claim 8, wherein the first current control circuitry is operable to stop supply of the second current signal to the first capacitive element after a voltage across the first capacitive element reaches a third predetermined value larger than the second predetermined value, and the third predetermined value is less than or equal to a value of the voltage across the first capacitive element when the first differential signal reaches its maximum value.

10. A discharge lamp lighting circuit as claimed in claim 1, wherein the first integral computation circuitry includes function computation circuitry to receive the first differential signal and to generate the second differential signal, and wherein the function computation circuitry is operable to convert the first differential signal into the second differential signal according to a function having a positive first slope when a magnitude of the first differential signal is smaller than a fourth predetermined value, and to convert the first differential signal into the second differential signal according to a function having a positive second slope smaller than the first slope when the magnitude of the first differential signal is larger than the fourth predetermined value.

* * * * *